(12) United States Patent
Hawryluck et al.

(10) Patent No.: US 9,077,413 B2
(45) Date of Patent: Jul. 7, 2015

(54) SYSTEM AND METHOD FOR TRANSPARENT COORDINATED BEAM-FORMING

(75) Inventors: Mark Andrew Hawryluck, Ottawa (CA); Ming Jia, Ottawa (CA); Jianglei Ma, Ottawa (CA)

(73) Assignee: Futurewei Technologies, Inc., Plano, TX (US)

(*) Notice: Subject to any disclaimer, the term of this patent is extended or adjusted under 35 U.S.C. 154(b) by 534 days.

(21) Appl. No.: 13/445,422

(22) Filed: Apr. 12, 2012

(65) Prior Publication Data

US 2012/0202431 A1    Aug. 9, 2012

Related U.S. Application Data

(63) Continuation-in-part of application No. 12/816,178, filed on Jun. 15, 2010, now Pat. No. 8,521,199.

(51) Int. Cl.
| | |
|---|---|
| *H04B 1/00* | (2006.01) |
| *H04B 15/00* | (2006.01) |
| *H04B 7/06* | (2006.01) |
| *H04B 7/02* | (2006.01) |
| *H04W 52/40* | (2009.01) |
| *H01Q 3/26* | (2006.01) |
| *H04W 52/14* | (2009.01) |

(52) U.S. Cl.
CPC ............ *H04B 7/0619* (2013.01); *H04B 7/024* (2013.01); *H04B 7/0617* (2013.01); *H04W 52/143* (2013.01); *H04W 52/40* (2013.01); *H01Q 3/26* (2013.01)

(58) Field of Classification Search
USPC ....................................... 455/63.4
See application file for complete search history.

(56) References Cited

U.S. PATENT DOCUMENTS

| | | | | |
|---|---|---|---|---|
| 6,748,222 | B1* | 6/2004 | Hashem et al. | 455/453 |
| 2005/0245237 | A1* | 11/2005 | Adachi et al. | 455/411 |

(Continued)

FOREIGN PATENT DOCUMENTS

| | | |
|---|---|---|
| CN | 101494481 A | 7/2009 |
| CN | 101686486 A | 3/2010 |
| KR | 10-2005-0068430 | 7/2005 |

OTHER PUBLICATIONS

"Ul Su—MIMO Antenna Calibration at UE," R1-090944, 3GPP TSG RAN WG1 #56, Feb. 9-13, 2009, 5 pages, Athens, Greece.

(Continued)

*Primary Examiner* — Ankur Jain
(74) *Attorney, Agent, or Firm* — Slater & Matsil, L.L.P.

(57) ABSTRACT

A method for reducing interference at a first user equipment (UE) includes receiving, by a second communications controller, a request to reduce interference at the first UE, the first UE being served by a first communications controller. The method also includes determining, by the second communications controller, a beam adjustment in accordance with uplink transmission measurements of the first UE and a second UE, the beam adjustment to aim a transmission to the second UE away from the second UE and towards an angle orthogonal to a first direction of the first UE relative to the second communications controller, the second UE being served by the second communications controller. The method further includes pre-adjusting, by the second communications controller, the transmission with the beam adjustment, and transmitting, by the second communications controller, the pre-adjusted transmission to the second UE.

26 Claims, 9 Drawing Sheets

(56) References Cited

U.S. PATENT DOCUMENTS

2009/0170437 A1* 7/2009 Bhattad et al. ............... 455/63.1
2010/0173660 A1* 7/2010 Liu et al. ..................... 455/501

OTHER PUBLICATIONS

Ericsson, "Channel reciprocity in FDD systems including systems with large duplex distance," R1-100853, TSG-RAN WG1 #60, Feb. 22-26, 2010, 5 pages, San Francisco, CA.

Foo, S.E., et al., "Uplink based Downlink Beamforming in UTRA FDD," European Cooperation in the Field of Scientific and Technical Research, Cost 273 TD (02)104, Sep. 19-20, 2002, 12 pages, Lisbon, Portugal.

Hugl, K., et al., "Spatial Reciprocity of Uplink and Downlink Radio Channels in FDD Systems," European Cooperation in the Field of Scientific and Technical Research, COST 273 TD(02) 066, May 30-31, 2002, 7 pages, Espoo, Finland.

International Search Report and Written Opinion received in Patent Cooperation Treaty Application No. PCT/CN2011/074654, dated Aug. 25, 2011, 7 pages.

Non-Final Office Action received in U.S. Appl. No. 12/816,178, dated Jan. 2, 2013, 10 pages.

Ericsson, et al., "On CSI Feedback for IMT-Advanced Fulfilling CoMP Schemes," 3GPP TSG RAN WG1, Meeting #57bis, R1-092737, Los Angeles, USA, Jun. 29-Jul. 3, 2009, 3 pages.

* cited by examiner

SYSTEM AND METHOD FOR TRANSPARENT COORDINATED BEAM-FORMING

This application is a continuation-in-part of U.S. application Ser. No. 12/816,178, filed on Jun. 15, 2010, entitled "System and Method for Transparent Coordinated Beam-Forming," which application is hereby incorporated herein by reference.

TECHNICAL FIELD

The present disclosure relates generally to a system and method for wireless communications, and more particularly to a system and method for transparent coordinated beam-forming.

BACKGROUND

Generally, coordinated beam-forming (CBF), also referred to as Coordinated Scheduling/Beamforming, is an effective yet cost efficient way to improve cell-edge throughput. Its main objective is to eliminate the flashlight effect in the interference caused by closed-loop multiple input, multiple output (CL-MIMO) operation, so as to restore the effectiveness in link adaptation. Another objective, although in less extent, is to reduce inter-cell interference (ICI), so as to improve the average throughput promised by user equipment (UE) measured signal to interference plus noise ratio (SINR).

Since in frequency division duplex (FDD) communications systems, the transmitter does not know the channel in the downlink (DL), limited channel state information (CSI) needs to be sent back by the UE to the transmitter. However, it has been agreed in the Third Generation Partnership Project (3GPP) Technical Specifications Group Radio Access Network Working Group One (TSG-RAN WG1) #60 meeting that no additional features are to be specified in Release-10 of 3GPP Long Term Evolution (LTE) technical standards to support DL coordinated multipoint (CoMP) transmission, which makes DL CoMP related UE feedback unavailable. To make CBF work, channel reciprocity between the uplink (UL) and the DL may be used.

SUMMARY

Example embodiments of the present disclosure which provide a system and method for transparent coordinated beam-forming.

In accordance with a preferred embodiment of the present disclosure, a method for reducing interference at a first user equipment (UE) is provided. The method includes receiving, by a second communications controller, a request to reduce interference at the first UE, the first UE being served by a first communications controller. The method also includes determining, by the second communications controller, a beam adjustment in accordance with uplink transmission measurements of the first UE and a second UE, the beam adjustment to aim a transmission to the second UE away from the second UE and towards an angle orthogonal to a first direction of the first UE relative to the second communications controller, the second UE being served by the second communications controller. The method further includes pre-adjusting, by the second communications controller, the transmission with the beam adjustment, and transmitting, by the second communications controller, the pre-adjusted transmission to the second UE.

In accordance with another preferred embodiment of the present disclosure, a method for reducing interference at a first user equipment (UE) served by a first communications controller is provided. The method includes identifying, by the first communications controller, the first UE as vulnerable to interference from transmissions of a neighbor communications controller to a second UE. The method also includes requesting, by the first communications controller, that the neighbor communications controller reduce the interference at the first UE by adjusting a transmission intended for the second UE away from the second UE and towards an angle orthogonal to a direction of the first UE relative to the neighbor communications controller, where adjusting the transmission is according to uplink transmission measurements of the first UE and uplink transmission measurements of the second UE. The method further includes transmitting, by the first communications controller, to the first UE after the neighbor communications controller has reduced interference to the first UE.

In accordance with another preferred embodiment of the present disclosure, an assisting communications controller is provided. The assisting communications controller includes a receiver, a processor operatively coupled to the receiver, and a transmitter operatively coupled to the processor. The receiver receives a request to reduce interference at a first UE, the first UE being served by a first communications controller. The processor determines a beam adjustment in accordance with uplink transmission measurements of the first UE and a second UE, the beam adjustment to aim a transmission to the second UE away from the second UE and towards an angle orthogonal to a first direction of the first UE relative to the assisting communications controller, the second UE being served by the assisting communications controller, and pre-adjusts the transmission with the beam adjustment. The transmitter transmits the pre-adjusted transmission to the second UE.

An advantage of an embodiment is that coordinated beam-forming may be implemented without requiring eNB radio frequency (RF) calibration, which may be difficult to implement due to issues such as high cost and high disparity between transmit power for actual transmissions and self-calibration.

A further advantage of an embodiment is that a reduction in feedback from UEs served by the eNBs is achieved, which may help to reduce communications system overhead and improve overall communications system performance.

Yet another advantage of an embodiment is that coordinated beam-forming may be used in both FDD and time division duplexed (TDD) communications systems. Furthermore, when applied to FDD communications systems, eNB RF calibration is not needed.

The foregoing has outlined rather broadly the features and technical advantages of the present disclosure in order that the detailed description of the embodiments that follow may be better understood. Additional features and advantages of the embodiments will be described hereinafter which form the subject of the claims of the disclosure. It should be appreciated by those skilled in the art that the conception and specific embodiments disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawing, in which:

FIG. 3b is a diagram of a detailed view of a processor shown in FIG. 3a.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a Third Generation Partnership Project (3GPP) Long Term Evolution (LTE) Release-10 compliant communications system without specific support for coordinated beam-forming. The disclosure may also be applied, however, to other communications systems, such as WiMAX, as well as other technical standards without specific support for coordinated beam-forming.

Figure 1:
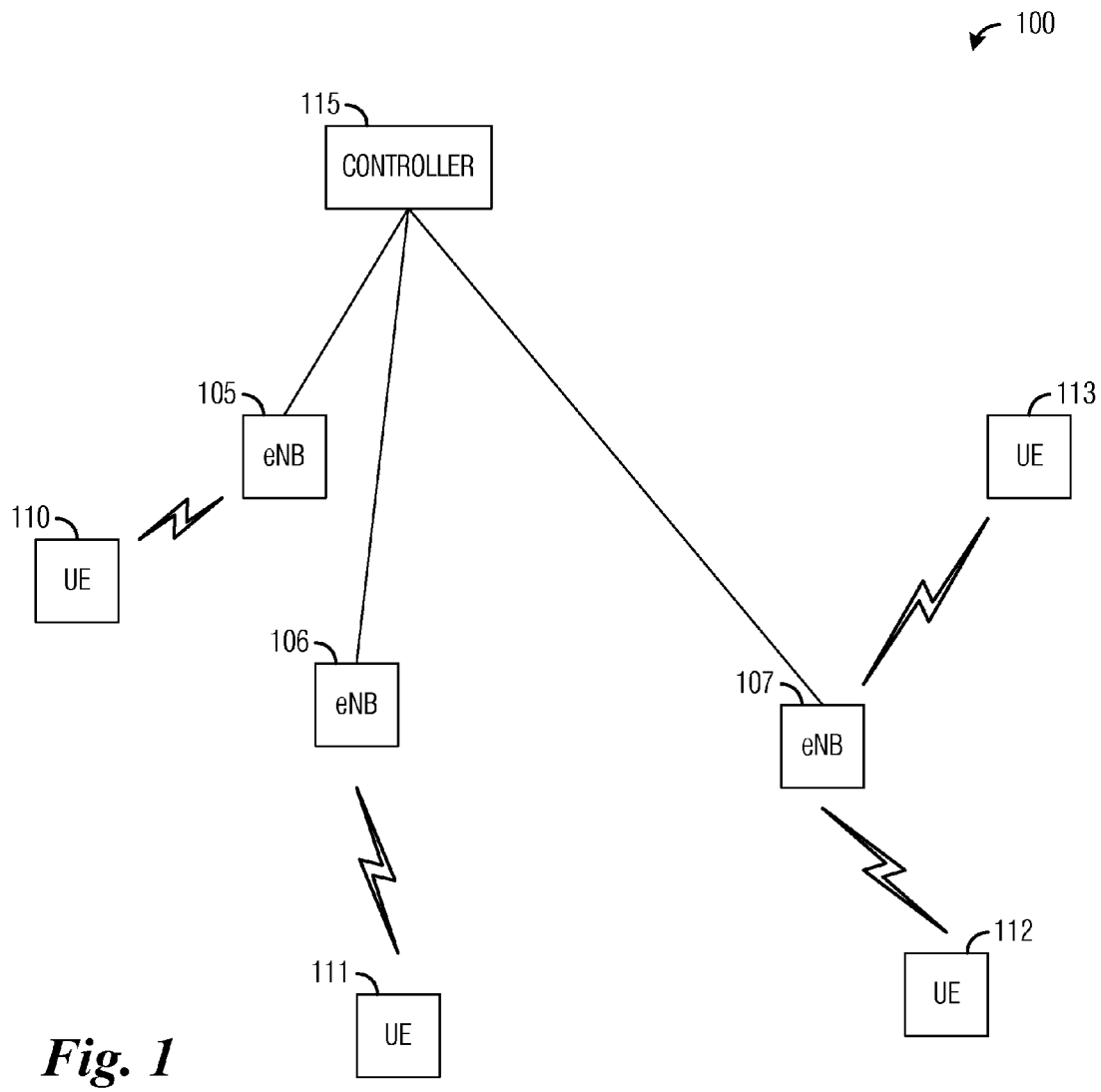
FIG. 1 is a diagram of a communications system.

FIG. 1 illustrates a communications system 100. Communications system 100 includes a number of enhanced NodeBs (eNB), such as eNB 105, eNB 106, and eNB 107. Each of the eNBs may be responsible for allocating network resources to UEs, such as UE 110, UE 111, UE 112, and UE 113, that it is serving. For example, an eNB may forward a transmission intended for a UE that it is serving or allocate some network resources to a UE that it is serving so that the UE may transmit information.

Some or all of the eNBs in communications system 100 may be operating in a coordinate beam-forming mode. The eNBs that are operating in a coordinated beam-forming mode may be referred to as being in an in-use subset of all eNBs since not all eNBs are required to participate in coordinated beam-forming mode. The eNBs that are operating in the coordinated beam-forming mode may coordinate between one another to select UEs for servicing that may help to minimize ICI.

According to an embodiment the UEs selected for servicing by an eNB may be selected based on their orthogonality to UEs serviced by other eNBs participating in coordinated beam-forming mode. The orthogonality of the UEs may be determined based on measurements of channels between the UEs and their respective serving eNBs as well as channels between the UEs and non-served UEs specified by neighboring eNBs. As an example, measurements of UL channels between UEs and eNBs may be used to compute an orthogonality between the UEs and the orthogonality may be used to select the UEs for servicing as well as potentially setting a transmit power to minimize ICI if needed.

According to an embodiment, if any two UEs serviced by different eNBs are orthogonal to one another or exceed a specified orthogonality threshold or exceed a correlation (computed based on the measured channels) threshold, then a standard or default transmit power may be used. However, if the UEs are not orthogonal, do not exceed a specified orthogonality threshold, or have a correlation that is greater than a specified correlation threshold, then the transmit power may be adjusted to reduce ICI.

As an example, transmissions between eNB 105 and UE 110 may receive interference from transmissions between eNB 106 and UE 111. However, if the transmissions are orthogonal or near orthogonal (i.e., the transmissions have small correlation), then ICI may be small and therefore, the transmit power may not need adjustment. However, if the transmissions are not orthogonal, i.e., the transmissions have high correlation, then ICI may be large unless the transmit power is adjusted.

Considerable effort has been applied to exploit channel reciprocity in TDD communications systems. Channel reciprocity typically involves RF chain calibration at an eNB, which may be performed using cross air signaling between the eNB and UEs, thereby requiring support in the technical standards. Recently, self calibration was discussed in LTE-Advanced, however, concerns remain because transmit power levels used for self calibration may be very different from that of transmit power levels used for normal signal transmission. The different transmit power levels raises questions about power amplifier linearity. Furthermore, when applied to eNB self calibration, the difference in transmit power levels are even greater. Additionally, in FDD communications systems, channel reciprocity becomes questionable due to different carrier frequencies used in the UL and DL channels.

Figure 2A:
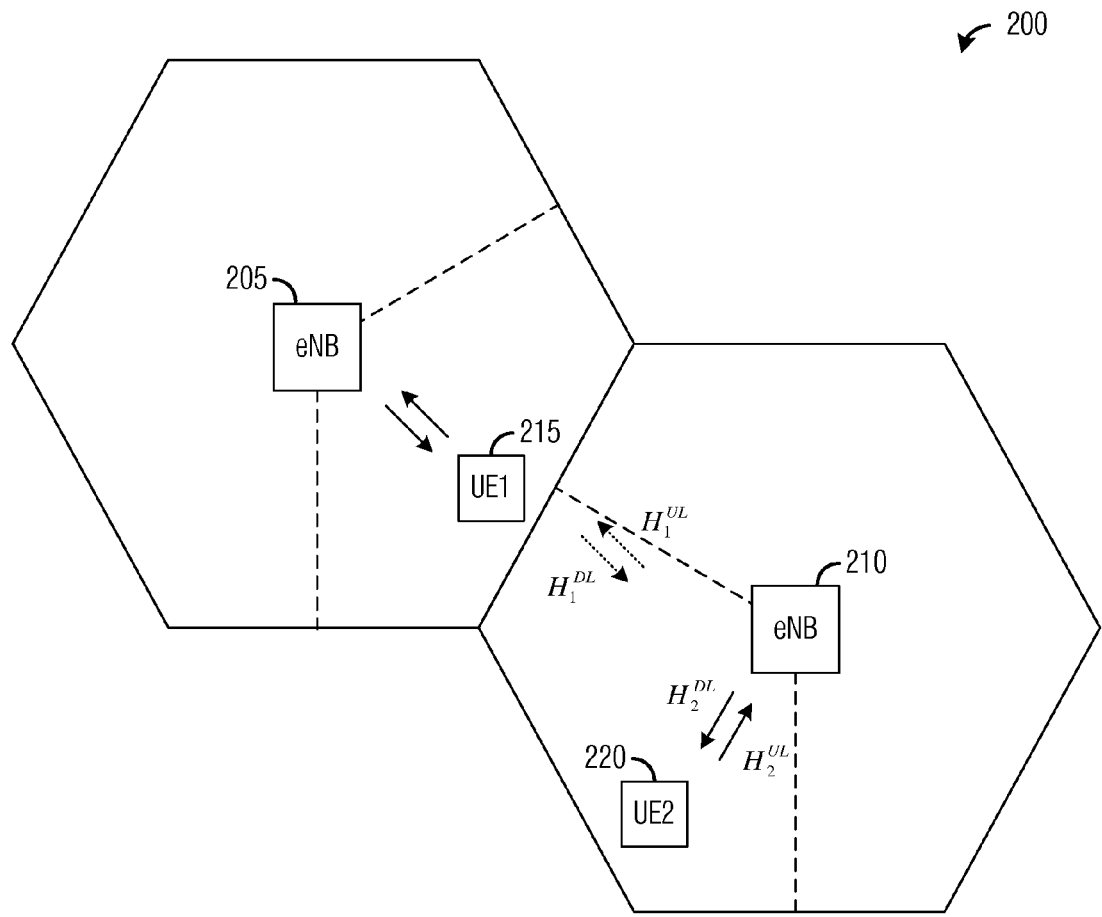
FIG. 2a is a diagram of a portion of a communications system.

FIG. 2a illustrates a portion of a communications system 200. Communications system 200 includes a first eNB 205 and a second eNB 210. First eNB 205 and second eNB 210 are adjacent to one another. First eNB 205 is serving a first UE "UE1" 215 and second eNB 210 is serving a second UE "UE2" 220. It is noted that UE1 215 may also be referred to as a master UE and UE2 220 may also be referred to as a slave UE. UE1 215 and UE2 220 may be operating in adjacent sectors in a coverage area of their respective serving eNBs and may be relatively close to each other.

First eNB 205 may transmit to UE1 215 over a DL channel and UE1 215 may transmit to first eNB 205 over an UL channel. Similarly, second eNB 210 may transmit to UE2 220 over a DL channel denoted as $H_2^{DL}$ and UE2 220 may transmit to second eNB 210 over an UL channel denoted as $H_2^{UL}$.

Since UE1 215 is relatively close to second eNB 210, transmission to and from UE2 220 may cause interference to transmissions to and from UE1 215. Transmissions to and from UE2 220 appearing as interference to transmissions to and from UE1 215 may be denoted as $H_1^{DL}$ for DL transmissions from first eNB 205 to UE1 215 and $H_1^{UL}$ for UL transmissions from UE1 215 to first eNB 205. Since UE2 220 may be far away from first eNB 205, interference from first eNB 205 to UE2 220 may be small.

Figure 2B:
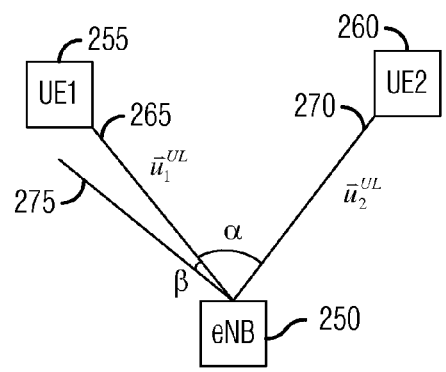
FIG. 2b is a diagram of notation used in discussion of the embodiments

FIG. 2b illustrates notation used in discussion of the embodiments. Illustrated in FIG. 2b are channels and angles of transmission between a cooperating eNB 250 and two UEs, a UE1 255 and a UE2 260. Line 265 represents a transmission corresponding to an UL channel from UE1 255 to cooperating eNB 250 appearing as interference to UE2 260 and line 270 represents a transmission corresponding to an UL channel from UE2 260 to its serving eNB. Line 265 may be representative of a direction of UE1 255 relative to eNB 250. Similarly, line 270 may be representative of a direction of UE2 260 relative to eNB 250. Line 275 represents a line for an orthogonal transmission to line 270. If the direction of UE1 255 is orthogonal to the direction of UE2 260, then line 265 and line 275 would be identical. Line 265 may be referred to as $\vec{u}_1^{UL}$ and line 270 may be referred to as $\vec{u}_2^{UL}$.

An angle α represents an angle between line 265 and line 270. If the direction of UE1 255 is orthogonal to the direction of UE2 260, then angle α would be 90 degrees. An angle β represents an angle between line 265 and line 275. If the direction of UE1 255 is orthogonal to the direction of UE2 260, then angle β would be 0 degrees.

Generally, when channel reciprocity is used, it is typically used in reference to a relationship between $H_1^{UL}$ and $H_1^{DL}$. In a TDD communications system, to derive $H_1^{DL}$ from $H_1^{UL}$, RF calibration may be needed.

In coordinated beam-forming mode, the orthogonality between the direction of UEs, such as UE1 255 and UE2 260 may be a point of concern. Usually, when the directions of UE2 260 and UE1 255 are not orthogonal, it may be beneficial to take a receiver direction of UE1 255 into account. When UE1 255 is unable to feed back its receiver direction, the orthogonality may be based solely on beam directions at a transmitter side.

Considering transmit and receive RF chains into consideration, the UL channels of UE1 255 and UE2 260 may be expressed as $$\tilde{H}_1^{UL} = K_{eNB,Rx} H_1^{UL} K_{1,Tx}$$

$$\tilde{H}_2^{UL} = K_{eNB,Rx} H_2^{UL} K_{2,Tx} \quad (1)$$

where $K_{eNB,Rx}$, $K_{1,Tx}$, and $K_{2,Tx}$ are diagonal matrices with complex gains of the transmit and receive chains.

Using singular value decomposition (SVD) on $\tilde{H}_1^{UL}$ and $\tilde{H}_2^{UL}$, the following may be obtained $$\tilde{H}_1^{UL} = K_{eNB,Rx} U_1^{UL} D_1^{UL} (\tilde{V}_1^{UL})^H$$

$$\tilde{H}_2^{UL} = K_{eNB,Rx} U_2^{UL} D_2^{UL} (\tilde{V}_2^{UL})^H \quad (2)$$

where $T_{UL \to DL}$ is a unitary diagonal complex transforming matrix for carrier frequency compensation, and $K_{eNB,Tx}$ is diagonal matrix with complex gains of the transmit chain. If $K_{eNB,Tx}$ is assumed to have constant modulus, which is usually the case for eNB, then the DL right singular matrices may be expressed as (with $(A)^T$ denoting the transpose of A)

$$\tilde{V}_1^{DL} = (T_{UL \to DL} K_{eNB,Tx} K_{eNB,Rx} U_1^{UL})^T$$

$$\tilde{V}_2^{DL} = (T_{UL \to DL} K_{eNB,Tx} K_{eNB,Rx} U_2^{UL})^T \quad (3)$$

which is also unitary.

Assume that $\vec{u}_1^{UL}$ and $\vec{u}_2^{UL}$ are the two principal singular vectors for $U_1^{UL}$ and $U_2^{UL}$, respectively, and $$\vec{f}_2^{DL} = (T_{UL \to DL} K_{eNB,Tx} K_{eNB,Rx} \vec{u}_2^{UL})^* \quad (4)$$

is the beam direction reported by UE2 260, then from Equation (4), if $\vec{u}_1^{UL} \perp \vec{u}_2^{UL}$, then $\vec{f}_1^{DL} \perp \vec{f}_2^{DL}$, where $$\vec{f}_1^{DL} = (T_{UL \to DL} K_{eNB,Tx} K_{eNB,Rx} \vec{u}_1^{UL})^* \quad (5)$$

is the principal eigen-direction for UE1 255.

The above discussed derivation show that if the two principal singular vectors ($\vec{u}_1^{UL}$ and $\vec{u}_2^{UL}$) for $U_1^{UL}$ and $U_2^{UL}$ are orthogonal in the UL, then the beam directions reported by UE1 255 and UE2 260 ($\vec{f}_1^{DL}$ and $\vec{f}_2^{DL}$) are also orthogonal in the DL.

In the context of coordinated beam-forming mode, an eNB receives beam direction feedback $\vec{f}_2^{DL}$ from its own served UE (e.g., UE2 260) but does not receive feedback from UEs served by other eNBs. Therefore, the eNB does not know if transmitting if the direction of $\vec{f}_2^{DL}$ will incur interference from a UE (e.g., UE1 255) served by other eNBs in its principal eigen-direction. With the result shown above, collisions of transmissions from two UEs (e.g., UE1 255 and UE2 260) may be prevented using UL measurements, which may be readily measured by the eNB.

According to an embodiment, there may be no need to determine the actual DL channels and no eNB RF calibration is needed.

Generally, CBF, like other CoMP techniques, may be subject to degradation due to feedback delay and/or delay between the arrival of coordination requests and the servicing of the requests. Therefore, CBF may be well suited to applications where the UEs have low mobility.

The use of channel spatial covariance for direction estimation may be appealing for a number of reasons: a) the channel spatial covariance matrix typically varies much more slowly than the coherence time and bandwidth of a channel, therefore, in a low mobility scenario, an excellent opportunity to realize significant averaging gain is provided; and b) the channel spatial covariance matrix may be averaged both in time and channel bandwidth to minimize the impact of channel estimation noise, correlation on channel estimation errors, as well as fast fading.

Applying SVD (or similar Eigen-decomposition methods) to long term and wideband averaged spatial covariance matrix, it may be possible to determine stable average direction according to a relative location and orientation of eNB and/or UE antennas. The direction may be used for CBF.

For a principal singular vector, $\vec{v}_1$, of covariance matrix R, a metric κ may be defined as a measure of beam strength $$v = Re(\vec{v}_1^H R \vec{v}_1)/\text{trace}(R), 1 \geq v \geq 1/N_{eNB},$$

$$\kappa = v N_{eNB} \quad (6)$$

where $N_{eNB}$ is the number of eNB antennas.

It is noted that the value of κ approaches 1 when there is very low correlation between transmitted antenna signals. The channel supports rank>1 most of the time in this case, and CBF is unlikely to provide meaningful gain. However, when κ approaches $N_{eNB}$, the channel has a clearly dominant (and persistent) eigenvector. The channel is likely to be rank 1 most of the time. A UE with large κ can reliably participate in CBF.

Figure 3A:
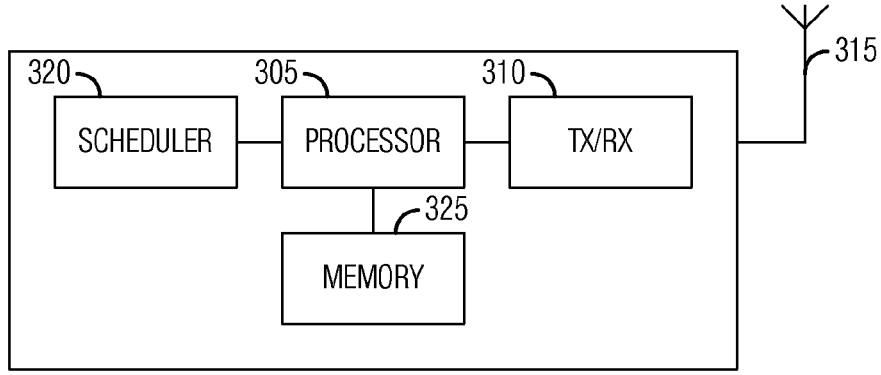
FIG. 3a is a diagram of an eNB.

FIG. 3a illustrates an eNB 300. eNB 300 may control communications to and from UEs that it is serving. eNB 300 may operate in several operating modes, including coordinated beam-forming mode. While operating in coordinated beam-forming mode, eNB 300 may coordinate with other eNBs also operating in coordinated beam-forming mode to reduce ICI to the other eNBs by adjusting transmit power to UEs that are not orthogonal or nearly orthogonal to UEs served by the other eNBs. If there are a sufficient number of UEs, eNB 300 may select UEs that are orthogonal (or nearly orthogonal) to UEs served by the other eNBs to receive transmissions or to transmit and force the non-orthogonal UEs to wait until they become orthogonal (or nearly orthogonal) as a result of their own mobility, the UEs served by the other eNBs change, or the mobility of the UEs served by the other eNBs.

eNB 300 may include a processor 305 that may be used to run applications and programs. Furthermore, processor 305 may be used to perform channel measurements of channels between eNB 300 and UEs served by eNB 300 as well as potentially UEs served by other eNBs. As an example, referencing back to FIG. 1, eNB 105 may compute channels between itself and UE 110 along with channels with UE 111 and UE 112 and other detectable UEs.

Processor 305 may also be used to coordinate with other eNBs when eNB 300 is operating in coordinated beam-forming mode. During coordination, eNB 300 and the other eNBs may share information regarding the UEs that they each serve, including identification information about the UEs, specific UEs that they wish to reduce ICI in order to improve the performance of the UE, location information for the UEs to assist other eNBs operating in coordinated beam-forming mode, and so forth.

Processor 305 may also be used to compute correlation values for UEs served by eNB 300 and UEs served by the other eNBs. The correlation values may be indicative of a relationship between two or more UEs and may be an indicator regarding the orthogonality between two or more UEs. The correlation value may be a measure of the impact of a transmission to or by a first UE to a transmission to or by a second UE and may be related to the orthogonality between the UEs. For example, if there is no correlation between two UEs, then the UEs may be orthogonal to one another or they may be so far apart that their transmissions do not interact. While if there is a high correlation between two UEs, then a transmission made by or to the first UE may have a large impact on transmissions to or by the second UE.

Processor 305 may also be used to adjust the transmit power of transmissions to UEs served by eNB 300 based on the computed correlation values. As discussed previously, the computed correlation values may be related to the orthogonality of the two UEs. Therefore, when there is a high correlation value between the two UEs, there may not be significant orthogonality between the two UEs and transmissions made to or from the first UE may an impact on the interference experienced by the second UE. When there is a high correlation between the two UEs, processor 305 may need to reduce a transmit power of transmissions made to or by the first UE to reduce interference to the second UE. When there is a low correlation between the two UEs, processor 305 may leave the transmit power of transmissions made to or by the first UE unchanged.

Processor 305 may also be used to select a beam to be used to transmit to UEs. The selection of the beams may also be based on the computed correlation values. A beam that may be finely focused and directed in the direction of a UE may cause less interference to communications in neighboring cells.

eNB 300 may also include a transmitter/receiver (TX/RX) 310 coupled to processor 305 that may be used to process information/data to be transmitted as well as process received information/data. For example, in addition to receiving and transmitting information/data, TX/RX 310 may filter, amplify, error detect, error correct, encode, decode, and so forth, the information/data. The information/data may be received or transmitted by way of an antenna 315. Although shown as a single antenna, antenna 315 may be an antenna array of multiple antennas. TX/RX 310 may also be used in measuring channels by processor 305.

eNB 300 may also include a scheduler 320 coupled to processor 305, which may be used to schedule transmission opportunities for UEs served by eNB 300 as well as schedule transmissions to UEs served by eNB 300. Scheduler 320 may make use of information, such as orthogonality information, correlation values, and so forth to schedule transmissions or transmission opportunities for UEs served by eNB 300. As an example, scheduler 320 may make use of a scheduling function with multiple inputs, such as orthogonality information, correlation values, coordination information received from the other eNBs, and so forth, to select UEs. Scheduler 320 may also select UEs based on information such as UE priority, data priority, UE service history, communications system traffic load, data buffer usage, data buffer status (full, empty, almost full, almost empty, fill rate, consumption rate, and so forth) in its selection of UEs.

eNB 300 may also include a memory 325 coupled to processor 305. Memory 325 may be used to store coordination information shared from other eNBs, channel measurements made by processor 305, orthogonality and/or correlation values derived from the channel measurements and/or coordination information, scheduling information provided by scheduler 320, information/data intended for UEs served by eNB 300, and so forth. Memory 325 may be implemented as read-only memories (ROMs), random access memories (RAMs), flash memories, erasable ROMs, or a combination thereof. For example, applications, which generally do not need to be changed and may need to be maintained while power is not being provided to eNB 300 may be stored in ROMs or erasable ROMs. Similarly, information that may need to be regularly updated and may not need to be stored except when eNB 300 is operating may be stored in RAMs.

Figure 3B:
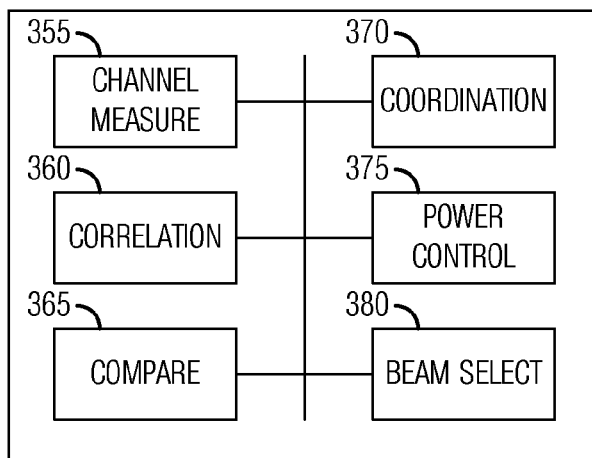

FIG. 3b illustrates a detailed view of processor 305. Processor 305 may be a processing unit, such as a general purpose microprocessor, a special purpose microprocessor, a micro controller, an application specific integrated circuit, a digital signal processor, and so forth, responsible for executing applications and programs, controlling operations of various components of eNB 300.

Processor 305 may include a channel measure unit 355 that may be used to measure channels between eNB 300 and UEs served by eNB 300 as well as other UEs detectable by eNB 300 but not served by eNB 300. Channel measure unit 355 may measure the channels by measuring transmissions made to and/or from the UEs over an extended period of time. Alternatively, if the transmissions to and/or from the UEs are accompanied by a unique reference sequence, the reference sequence may be used to measure the channels.

Processor 305 may also include a correlation unit 360 that may be used to compute a correlation value between two or more UEs. According to an embodiment, correlation unit 360 may make use of the channel measurements as provided by channel measurement unit 355 to compute the correlation values. As discussed previously, the correlation values may be an indication of the orthogonality between the UEs. A detailed discussion of the computation of the correlation values is provided below.

Processor 305 may also include a compare unit 365. Compare unit 365 may be used to compare the correlation value between two or more UEs with a threshold to determine if transmit power levels need to be adjusted. For example, if the correlation value exceeds the threshold, then the transmit power levels need to be adjusted, while if the correlation value does not exceed the threshold, the transmit power levels do not need to be adjusted. According to an embodiment, compare unit 365 may be implemented using a comparator of sufficient size (inputs).

Processor 305 may also include a coordination unit 370. Coordination unit 370 may be used to exchange information related to UEs served by eNB 300 with other eNBs also operating in coordinated beam-forming mode. Coordination unit 370 may transmit information related to UEs served by eNB 300 to the other eNBs and receive information related to the UEs served by the other eNBs. Coordination unit 370 may include a timer to determine when coordination is to take place, and so forth.

Processor 305 may also include a power control unit 375. Power control unit 375 may receive as input a desired transmit power level and may generate a power control word that may be provided to a power amplifier of TX/RX 310 so that a transmission may be suitably amplified. If the transmit power level is for a transmission to be made by a UE served by eNB 300, the power control word may be included in a transmission opportunity grant message to be transmitted to the UE. The UE upon receipt of the transmission opportunity grant message may set its transmit power level according to the power control word.

Processor 305 may also include a beam select unit 380. Beam select unit 380 may select a beam to be used to transmit to a UE and may make the beam selection based on the correlation value, as well as beam information, such as preferred beam information, provided by the UE. The preferred beam information may be an indication of the UE's preferred beam, which may have resulted in a highest SINR or some other channel quality measurement at the UE.

As discussed previously, a main objective of coordinated beam-forming mode is to avoid the flashlight effect so that link adaptation of CL-MIMO may work properly for cell-edge UEs (i.e., UEs operating at or near the edge of the coverage area of their serving eNB). In order to achieve the objective, it may be necessary to rely on UE pairings so that a serving eNB, such as second eNB 210, may schedule a first UE, such as UE2 220, with $\vec{u}_2^{UL}$ that is orthogonal (or approximately orthogonal) to $\vec{u}_1^{UL}$ of a second UE, such as UE1 215, so that it may be possible to achieve effective spatial multiplexing without causing the flashlight effect to the second UE. However, it may be unlikely to find a $\vec{u}_2^{UL}$ that is exactly orthogonal to $\vec{u}_1^{UL}$ and although $\vec{u}_2^{UL}$ may not need to be exactly orthogonal to $\vec{u}_1^{UL}$, a certain degree of orthogonality may be needed to eliminate the flashlight effect.

For discussion purposes, assume that $N_T$ is the number of transmit antennas at an eNB, $\rho_f$ is the interference caused by the flashlight effect, and $\rho_m$ is the UE measured average interference based on which CQI report is calculated, then the relation between $\rho_f$ and $\rho_m$ is expressible as $$\rho_f = N_T \rho_m, \tag{7}$$

thereby providing a guideline for a cooperating eNB, e.g., first eNB 205, to eliminate the flashlight effect, for instance. Then $\vec{u}_2^{UL}$ needs to satisfy $$\left|(\vec{u}_1^{UL})^H \vec{u}_2^{UL}\right|^2 \le \frac{1}{N_T},$$

e.g. be π/4 away from $\vec{u}_1^{UL}$ for $N_T=2$ and 43 away for $N_T=4$. Since the cooperating eNB knows its own $N_T$, it knows its beam operating region.

However, if the cooperating eNB cannot find a UE that it is serving that meets the orthogonality requirement, but if the cooperating eNB has a UE that is not far away from the orthogonality requirement, there may be two ways to make the UE pairing more flexible, namely beam adjustment and/or power adjustment.

A small amount of beam adjustment in the cooperating eNB may be very effective in reducing the flashlight effect since the cooperating eNB's scheduler knows the beam adjustment level and therefore, the post adjustment CQI. Additionally, the signal energy loss due to the beam adjustment may be small.

Figure 4:
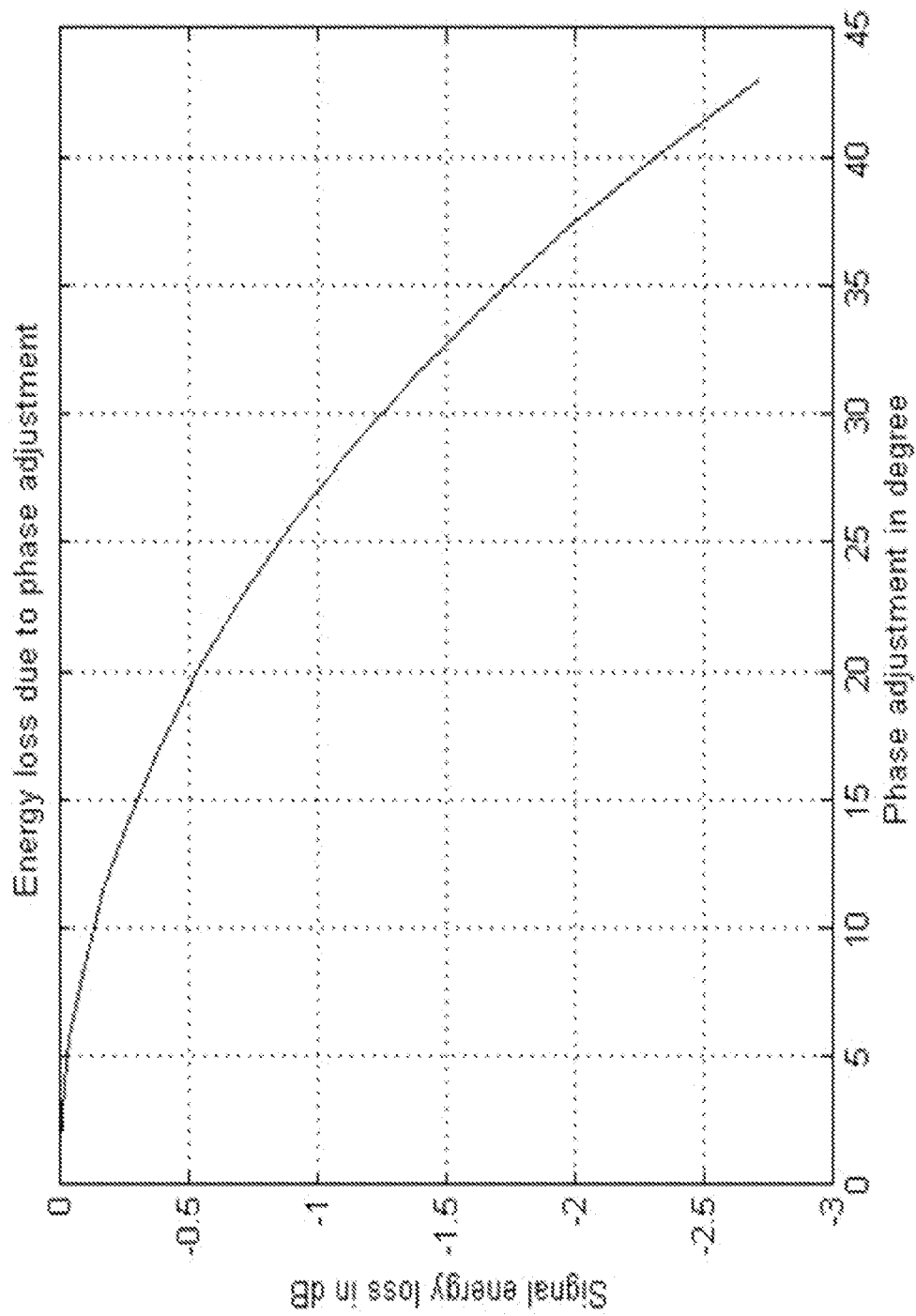
FIG. 4 is a plot of signal energy loss for different phase adjustment amounts.

FIG. 4 illustrates a plot of signal energy loss for different phase adjustment amounts. As an example, in FIG. 4, when the phase adjustment level is about 20 degrees, the signal energy loss is only about 0.5 dB.

Since $\vec{f}_1^{UL}$ may not be know, how is the adjusted beam direction $\vec{f}_{2,adj}^{DL}$ found? Again, the correlation between $\vec{u}_1^{UL}$ vs. $\vec{u}_2^{UL}$ and $\vec{f}_1^{DL}$ vs. $\vec{f}_2^{DL}$ may be used. Given $\vec{u}_1^{UL}$ and $\vec{u}_2^{UL}$, the direction that is orthogonal to $\vec{u}_1^{UL}$ but with maximum correlation to $\vec{u}_2^{UL}$ may be expressible as $$\vec{u}_{2\perp 1}^{UL} = \frac{\vec{u}_2^{UL} - ((\vec{u}_1^{UL})^H \vec{u}_2^{UL})\vec{u}_1^{UL}}{\left\|\vec{u}_2^{UL} - ((\vec{u}_1^{UL})^H \vec{u}_2^{UL})\vec{u}_1^{UL}\right\|}. \tag{8}$$

Hence, the actual beam direction, with $\vec{u}_{2,adj}^{UL}$ being (90°−α) away from $\vec{u}_1^{UL}$, being expressible as $$\vec{u}_{2,adj}^{UL} = \cos(\alpha)\vec{u}_{2\perp 1}^{UL} + \eta\sin(\alpha)\vec{u}_1^{UL}, \tag{9}$$

where $$\eta = \frac{(\vec{u}_1^{UL})^H \vec{u}_2^{UL}}{\left|(\vec{u}_1^{UL})^H \vec{u}_2^{UL}\right|}. \tag{10}$$

Since $\vec{u}_{2,adj}^{UL}$ is actually a rotation of $\vec{u}_2^{UL}$, $\vec{u}_{2,adj}^{UL}$ can be related to $\vec{u}_2^{UL}$ through a rotation matrix $\Phi_2$ expressible as $$\vec{u}_{2,adj}^{UL} = \Phi_2 \vec{u}_2^{UL}. \tag{11}$$

It is noted that rotation matrix $\Phi_2$ may also be referred to as a unitary matrix $\Phi_2$. From Equations (4) and (5), it may be observed that if the following definition is made $$\vec{f}_{2,adj}^{DL} = \Phi_2 \vec{f}_2^{DL}, \tag{12}$$

then the relation between $\vec{f}_{2,adj}^{DL}$ and $\vec{f}_2^{DL}$ be the same as that between $\vec{u}_{2,adj}^{UL}$ and $\vec{u}_2^{UL}$. An assumption that the UL channel and the DL channel are directly reciprocal is not made. Instead, an assumption regarding the relation between the UL beams and the DL beams are reciprocal is made, which is a more relaxed condition.

In practice, given $\vec{u}_{2,adj}^{UL}$ and $\vec{u}_2^{UL}$, finding $\Phi_2$ can be complex. An alternative way may be through transmit power adjustment, which is an extension of the concept from fractional frequency reuse (FFR), with a difference being the adjustment to the transmit power being used to eliminate the flashlight effect. Since $\vec{u}_2^{UL}$ is not far away from the orthogonality requirement, the transmit power adjustment may be small, which may help in avoiding unnecessarily triggering hybrid automatic repeat request (HARD) transmissions for the coordinated beam-forming mode UE, and to improve link adaptation efficiency.

Transmit power adjustment may also give coordinated beam-forming mode a greater degree of flexibility in UE pairing since it may be possible to pair two colliding UEs. In an extreme example, it may be possible for a pair of full beam colliding UEs to transmit, but with transmit power adjustment, the flashlight effect may be more precisely controlled.

For discussion purposes, let $P_2$ be the transmit power for UE-2, $P_{2,adj}$ be the adjusted transmit power level if $\vec{u}_2^{UL}$ is less than (90°−α) away from $\vec{u}_1^{UL}$, and β be the angle between $\vec{u}_2^{UL}$ and the required orthogonality, then the adjusted power level may be expressible as $$P_{2,adj} = \frac{\sin^2(\alpha)}{\sin^2(\alpha+\beta)} P_2. \quad (13)$$

In practice, α may be a prespecified (or semi-static) parameter, and hence $\sin^2(\alpha)$ is known in advance. In addition, $\sin^2(\alpha+\beta)$ may be easily calculated as $$\sin^2(\alpha+\beta)=|(\vec{u}_1^{UL})^H(\vec{u}_2^{UL})|^2 > \sin^2(\alpha). \quad (14)$$

Equation (1312) may be used only when $$|(\vec{u}_1^{UL})^H(\vec{u}_2^{UL})|^2 > \sin^2(\alpha) \quad (15)$$

From the above discussion, transparent coordinated beam-forming mode may be formed in an easy and flexible way, i.e., by combining beam-based UE pairing and UE centric FFR. Most of the flashlight effect may be eliminated by the beam-based UE pairing, while the UE centric FFR may be used to remove residual flashlight effect and guarantee link adaptation functionality.

Furthermore, CQI adjustments for the cooperating eNB may be straightforward since the cooperating eNB has all of the information needed. Let $\gamma_2$ be the reported CQI, and $\gamma_{2,adj}$ be the adjusted CQI, then $\gamma_{2,adj}$ may be expressible as $$\gamma_{2,adj} = \frac{\sin^2(\alpha)}{\left|(\vec{u}_1^{UL})^H(\vec{u}_2^{UL})\right|^2} \gamma_2 \quad (16)$$

for transmit power adjustment, and $$\gamma_{2,adj}=|(\vec{u}_2^{UL})^H \vec{u}_{adj}^{UL}|^2 \gamma_2 \quad (17)$$

for beam adjustment.

CQI adjustment for the serving eNB, e.g., second eNB 210, may be more complex since it may be related to interference estimation, which the serving eNB may not have direct information. One technique that may be used to solve this problem is to use a reference signal received power (RSRP) report from the second UE. Since a RSRP report indicates long-term interference levels, it may be possible to adjust the CQI as follows $$\gamma_{1,adj} = \frac{\gamma_1}{I_{adj}}, \quad (18)$$

where $$I_{adj} = 1 - \frac{\chi_k(1 - N_T \sin^2(\alpha))}{\sum \chi_m}, \quad (19)$$

with $\chi_m$ being the RSRP report from the m-th neighboring cell, and $\chi_k$ being the RSRP report from the cooperating eNB (or eNBs).

Figures 5, 6:
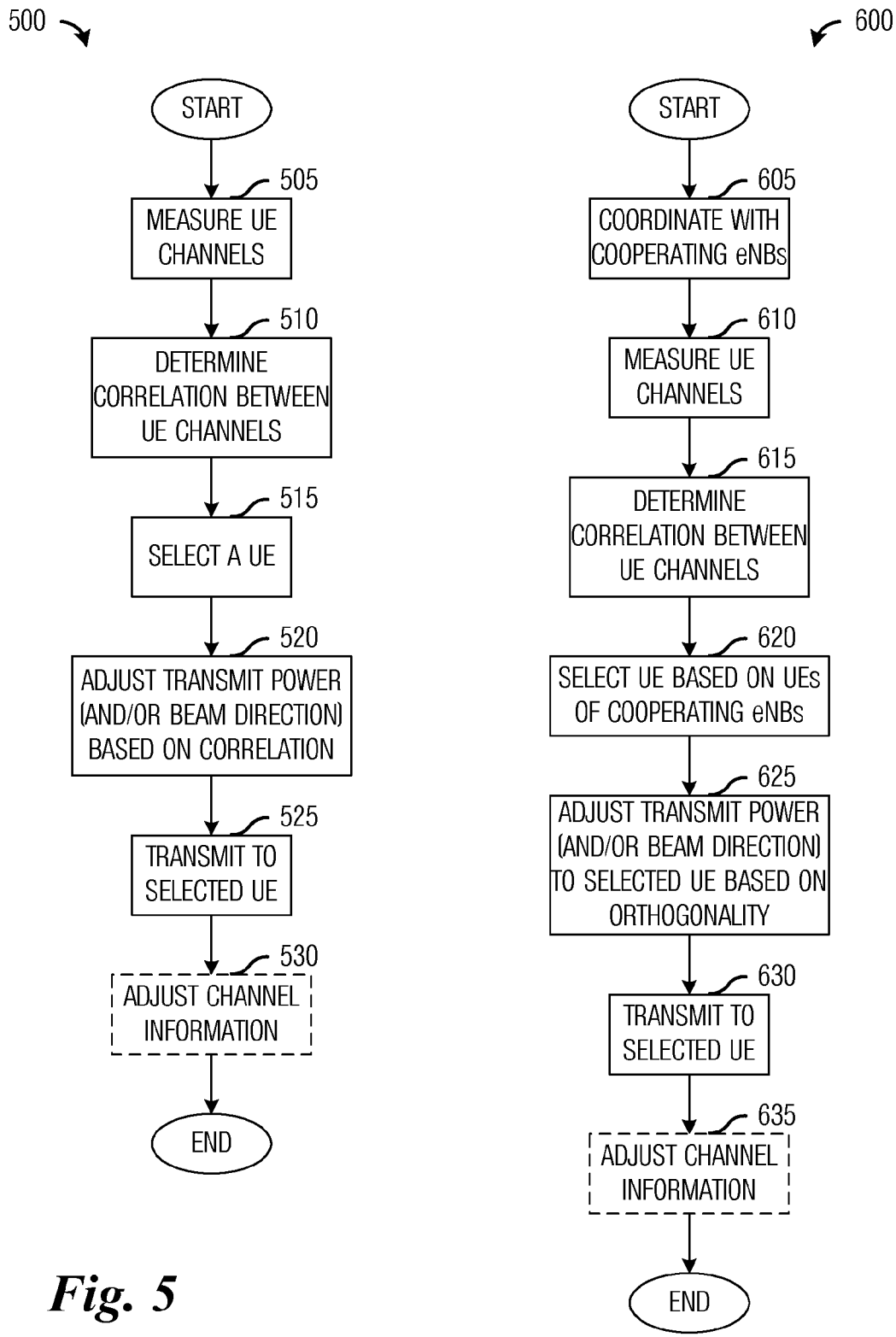
FIG. 5 is a flow diagram of eNB operations in the transmitting of information to a UE using coordinated beam-forming mode.
FIG. 6 is a flow diagram of eNB operations in the transmitting of information to a UE using coordinated beam-forming mode with coordination from cooperating eNBs.

FIG. 5 illustrates a flow diagram of eNB operations 500 in the transmitting of information to a UE using coordinated beam-forming mode. eNB operations 500 may be indicative of operations occurring in a cooperating eNB as the cooperating eNB and a serving eNB operate in a coordinated beam-forming mode to help reduce or eliminate ICI to the serving eNBs and its UEs. eNB operations 500 may occur while the cooperating eNB is operating in a coordinated beam-forming mode with information to transmit to the UE.

eNB operations 500 may begin with the cooperating eNB measuring channels between itself and UEs (block 505). According to an embodiment, in addition to measuring channels between itself and UEs that it is serving, the cooperating eNB may also make channel measurements based on UL transmissions made by UEs denoted by adjacent serving eNBs that may need protection from ICI, such as cell edge UEs. According to an alternative embodiment, the cooperating eNB may make channel measurements between itself and all detectable UEs, including those that it is not serving. An example of channel measurements may be direction of incidence (DOI) measurements, and so forth.

The cooperating eNB may then compute correlation values between UE pairings consisting of UEs that it is serving and UEs of neighboring eNBs (block 510). The correlation values may be an indication of the orthogonality of the UEs in each of the UE pairings. According to an embodiment, the cooperating eNB may compute correlation values for each of its own UEs paired with UEs of the neighboring eNBs specifically designated by the neighboring eNBs (the serving UEs) as potentially needing protection from ICI. According to an alternative embodiment, the cooperating eNB may compute correlation values for each of its own UEs paired with each UE of the neighboring eNBs that the cooperating eNB is capable of detecting.

According to an embodiment, the correlation values may be computed as $$|(\vec{u}_1^{UL})^H(\vec{u}_2^{UL})|,$$

where both $\vec{u}_1^{UL}$ and $\vec{u}_2^{UL}$ are directional vectors of unit length and may be measured by the cooperating eNB in block 505, for example. The correlation values may be in the range of (0, 1) with the larger the correlation value, the more correlated the two UEs are. In other words, the larger the correlation value, the less orthogonal the two UEs are.

The cooperating eNB may then select a UE for transmission (block 515). The cooperating eNB may also select a network resource over which the transmission to the selected UE may occur. According to an embodiment, the cooperating eNB may select a UE for transmission based on considerations such data being held in a buffer intended for the UE, the correlation value of the UE, priority of the UE, priority of the data being buffered for the UE, historical serving history for the UE, and so forth. As an example, the cooperating eNB may select a UE that has a lowest correlation value (most orthogonal) with data buffered in memory. Alternatively, the cooperating eNB may select a UE with a slightly higher correlation value but with higher priority data buffered in memory.

The cooperating eNB may then adjust the transmit power level for the selected UE based on the correlation value (block 520). According to an embodiment, the cooperating eNB may check the correlation value of the selected UE and if the correlation value exceeds a threshold, then the cooperating eNB may adjust the transmit power level. As an example, the transmit power level may be adjusted based on relative angles between the selected UE and a UE from a neighboring eNB, expressible as $$P_{2,adj} = \frac{\sin^2(\alpha)}{\sin^2(\alpha+\beta)} P_2,$$

where $\beta$ be an angle between $\vec{u}_2^{UL}$ and a required orthogonality, $\alpha$ may be a prespecified (or semi-static) parameter, and $P_2$ be an unadjusted transmit power level.

According to an embodiment, rather than adjusting the transmission power level, the cooperating eNB may adjust a beam direction used in the transmission. Based on the correlation value, the eNB may adjust a beam direction from a default beam to a preferred beam for the UE being scheduled, wherein the preferred beam for the UE may be reported by the UE itself, selected based on a known position of the UE, or so forth, for example. A beam may be selected to be used in the transmission to the UE that is more directed towards the UE so that ICI caused by the transmission to the UE may be reduced.

According to an embodiment, both adjusting the beam direction and the transmission power level may be adjusted based on the orthogonality. A beam that is more directed towards the UE may be selected to reduce a significant amount of ICI and the transmission power level may also be adjusted to further reduce the ICI.

If the correlation value does not exceed the threshold, then the transmit power level (and/or the beam direction) may not need to be adjusted and the cooperating eNB may transmit to the selected UE at a default transmit power level as well as potentially on a default beam. The cooperating eNB may then transmit to the selected UE at the selected network resource at the transmit power level and/or selected beam (block 525) and eNB operations 500 may then terminate.

eNB operations 500 may optionally include the cooperating eNB adjusting channel information received in reports from the UEs served by the cooperating eNB (block 530). According to an embodiment, the adjusting of the channel information may compensate for adjustments that may have been made in transmit power levels of transmissions (as well as beam selections) made by the cooperating eNB. According to an embodiment, the cooperating eNB may adjust the channel information based on RSRP reports received from the UEs, as shown in Equations (17) and (18).

Similarly, the serving eNB may also adjust the channel information received from its own UEs. According to an embodiment, the serving eNB may adjust the channel information as shown in Equations (15) and (16).

FIG. 6 illustrates a flow diagram of eNB operations 600 in the transmitting of information to a UE using coordinated beam-forming mode with coordination from neighboring eNBs. eNB operations 600 may be indicative of operations occurring in a cooperating eNB as the cooperating eNB operates in a coordinated beam-forming mode to help reduce or eliminate ICI to neighboring eNBs and their UEs. The cooperating eNB may coordinate with neighboring eNBs to share information regarding served UEs. eNB operations 600 may occur while the cooperating eNB is operating in a coordinated beam-forming mode with information to transmit to the UE.

eNB operations 600 may begin with the cooperating eNB coordinating with the neighboring eNBs, also referred to as serving eNBs (block 605). According to an embodiment, the cooperating eNB and the neighboring eNBs may share information such as UE identity, specific UEs that each eNB wishes to protect from interference, and so forth.

The cooperating eNB may then measure channels between itself and UEs that it is serving as well as UEs that the neighboring eNBs wish to protect (block 610). According to an embodiment, the cooperating eNB may make channel measurements based on UL transmissions made by the UEs. An example of channel measurements may be DOI measurements, and so forth.

The cooperating eNB may then compute correlation values between UE pairs consisting of the UEs that it serving and UEs of neighboring eNBs (block 615). The correlation values may be an indicator of the orthogonality of the UE pairs (UEs served by the cooperating eNB and the UEs of the neighboring eNBs). According to an embodiment, the cooperating eNB may compute correlation values for each of the UE pairs consisting of its own UEs paired with UEs of the neighboring eNBs specifically designated by the neighboring eNBs. According to an alternative embodiment, the cooperating eNB may compute correlation values for each of the UE pairs consisting of its own UEs paired with each UE of the neighboring and serving eNBs that the cooperating eNB is capable of detecting.

The cooperating eNB may then select a UE for transmission (block 620). The cooperating eNB may also select a network resource over which the transmission to the selected UE may occur. According to an embodiment, the cooperating eNB may select a UE for transmission based on considerations such data being held in a buffer intended for the UE, the correlation value of the UE, priority of the UE, priority of the data being buffered for the UE, historical serving history for the UE, and so forth. As an example, the cooperating eNB may select a UE that has a lowest correlation value (most orthogonal) with data buffered in memory. Alternatively, the cooperating eNB may select a UE with a slightly higher correlation value but with higher priority data buffered in memory.

The cooperating eNB may then adjust the transmit power level (and/or a beam direction used for transmission) for the selected UE based on the correlation value (block 625). According to an embodiment, the cooperating eNB may check the correlation value of the selected UE and if the correlation value exceeds a threshold, then the cooperating eNB may adjust the transmit power level and/or the beam direction. If the correlation value does not exceed the threshold, then the transmit power level and/or the beam direction may not need to be adjusted and the cooperating eNB may transmit to the selected UE at a default transmit power level and/or default beam direction. The cooperating eNB may then transmit to the selected UE at the selected network resource at the transmit power level and beam direction (either adjusted or default) (block 630) and eNB operations 600 may then terminate.

eNB operations 600 may optionally include the cooperating eNB adjusting channel information received in reports from the UEs served by the cooperating eNB (block 635). According to an embodiment, the adjusting of the channel information may compensate for adjustments that may have been made in transmit power levels of transmissions made by the cooperating eNB. According to an embodiment, the cooperating eNB may adjust the channel information based on RSRP reports received from the UEs, as shown in Equations (17) and (18).

It is noted that the evaluation of Equation (8) above may be recognizable as a first step in the Gram-Schmidt orthogonization procedure. Cooperation may be extended to multiple master UEs (e.g., UEs needing cooperation, such as UE1 215 of FIG. 2a) with this technique.

One special case, which may be of interest, involves $\vec{f}_2^{DL}$ being a constant modulus vector (for example, $\vec{f}_2^{DL}$ may be from a 3GPP LTE codebook for precoding in a communications system using single-user MIMO (SU-MIMO)) and where it may be chosen that $\vec{f}_{2,adj}^{DL}$ is also constant modulus. To implement downlink beam adjustment under these conditions, there may be a requirement that a diagonal $\Phi_2$ also has constant modulus non-zero elements. It may be observed that for small beam adjustments, for example, on the order of 20 degrees or less, the elements of $\vec{u}_{2,adj}^{UL}$, and $\vec{u}_2^{UL}$, may be such that $|u_{2,i,adj}^{UL}| \cong |u_{2,i}^{UL}|$.

Taking note of the above, a simplified form for the beam rotation matrix $\Phi_2$ may be chosen as a diagonal matrix with non-zero elements given by $\phi_{2,ii} = u_{2,i,adj}^{UL}/u_{2,i}^{UL}$. Under the condition stated above, i.e., $|u_{2,i,adj}^{UL}| \cong |u_{2,i}^{UL}|$, the beam rotation matrix $\Phi_2$ may be approximately constant modulus (in other words, it has non-zero elements such that $|\phi_{2,ii}| \cong 1$).

As indicated in the previous section, beam correction may be limited to bound the penalty experienced by a slave UE in the cooperating cell, e.g., UE2 220 of FIG. 2a. Beam adjustment may also be omitted in cases where it may be desirable to use codebook based precoding. In either situation, UE-centric power adjustment may be required to achieve the interference mitigation objective.

As an example, residual flashlight effect may be eliminated by selecting a power scaling factor $1 \geq \eta > 0$, such that $$\eta \kappa |\vec{w}_{UL,coop}^H \vec{w}_{UL,CBF}|^2 = 1. \tag{20}$$

As an example, it may be possible to modify the beam correction for a situation wherein cross-polarized antennas are used at the eNB and the UE. For discussion purposes, consider a situation where a configuration of the co-polarized antennas are known, e.g., transmit antenna polarizations are known. It is noted that in co-polarized antennas, the direction of the electric field vector of the transmit antennas are in the same direction. As an example, the electric field vector of the transmit antennas are vertically polarized, horizontally polarized, circularly polarized, and the like. The knowledge of the configuration of the co-polarized antennas allows for knowledge of the organization of the transmit covariance matrix. Generally, in a 3GPP LTE compliant communications system, a labeling of the transmit antennas are such that a block diagonal (or near block diagonal) spatial covariance matrix is derived from the transmit covariance matrix. The spatial covariance matrix may be expressible as $$R = \begin{bmatrix} R_{hh} & R_{hv} \\ R_{vh} & R_{vv} \end{bmatrix} = \begin{bmatrix} R_{hh} & \approx 0 \\ \approx 0 & R_{vv} \end{bmatrix}. \tag{21}$$

It may then be possible to formulate a similar expression for the covariance of the co-polarized antennas based on a composite direction, which may be expressible as $$V_{comp} = \begin{bmatrix} u_{1,hh} \\ u_{1,vv} \end{bmatrix}, \tag{22}$$

where $u_{1,hh}$ and $u_{1,vv}$ are leading Eigen-vectors of $R_{hh}$ and $R_{vv}$, respectively. It is noted that the long term relative powers of the two polarizations may be ignored. As with co-polarized antennas, for cross polarized antennas (where the polarization of the transmit antennas are crossed, for example, one transmit antenna may have a horizontal polarization and another transmit antenna may have a vertical polarization), it may be observed that the beam rotation matrix, $\Phi_2$, need only be a diagonal matrix with constant modulus diagonal entries in the case where $\vec{f}_2^{DL}$ and $\vec{f}_{2,adj}^{DL}$ are both constant modulus. Furthermore, in the case of small beam adjustments, it may be reasonable choose to approximate $\Phi_2$ as a diagonal matrix though not one with strictly constant modulus non-zero elements, given by: $\phi_{2,ii} = u_{2,i,adj}^{UL}/u_{2,i}^{UL}$. It is also noted that the computations in the cross-polarized antennas case are nearly identical to computations used in the case of co-polarized antennas discussed above.

As an example, the CQI adjustment for the cooperating cell may be straightforward because the cooperating eNB has the information that it requires. It may be possible to formulate the adjusted SINR, $\gamma_{adj}$, for the cooperating UE as $$\gamma_{adj} = \gamma_{rep} |w'_{DL,coop}^H \cdot w_{DL,coop}|^2 L_{PA}, \tag{23}$$

where $\gamma_{rep}$ is the SINR prior to coordination, and the term $|w'_{DL,coop}^H \cdot w_{DL,coop}|^2$ accounts for beam adjustment, and $L_{PA}$ is a factor accounting for power reduction due to UE fractional frequency reuse.

The CQI adjustment for the serving cell (i.e., eNB 205) may be more difficult to derive since it is related to an interference estimation of which the serving cell may not have direct information. It may be possible to use a RSRP report from the slave UE. Since the RSRP report indicates long term interference level, it may be possible to adjust the CQI as follows $$\gamma_{1,adj} = \frac{\gamma_1}{I_{adj}}, \tag{24}$$

where $$I_{adj} = 1 - \frac{\chi_k(1 - N_T \sin^2(\alpha))}{\sum \chi_m}, \tag{25}$$

with $\chi_m$ being a RSRP report from an m-th neighboring cell, and $\chi_k$ being a RSRP report from the cooperating cell (or cells).

Figure 7:
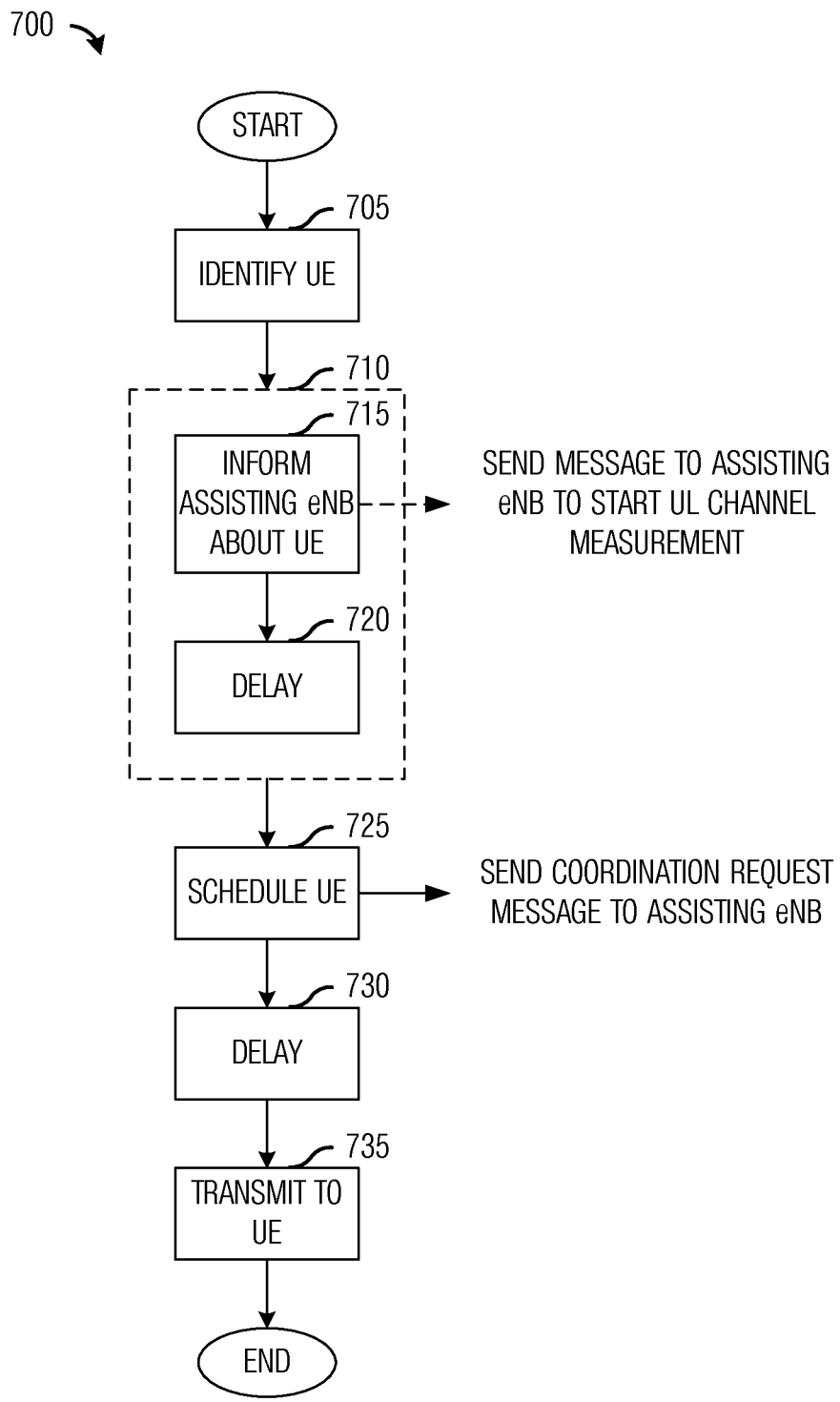
FIG. 7 is a flow diagram of operations occurring in an eNB as the eNB transmits to a UE that may be interfered with by transmissions to another UE operating in a neighboring cell.

FIG. 7 illustrates a flow diagram of operations 700 occurring in an eNB as the eNB transmits to a UE that may be interfered with by transmissions to another UE operating in a neighboring cell. Operations 700 may be indicative of operations occurring in an eNB, such as eNB 205 of FIG. 2a, as the eNB transmits to a UE, such as UE1 215. It is noted that the neighboring cell may be different eNBs, a different sector of a single eNB, or different remote radio heads controlled by a single eNB.

Operations 700 may begin with the eNB identifying the UE (block 705). As an example, the eNB may identify UEs that may be interfered with by transmissions to other UEs operating in neighboring cells according to where the UEs are operating. As another example, a UE that is operating at an edge of a coverage area of the eNB may be susceptible to interference since it is closer to eNBs serving the neighboring cells, while a UE that is operating at or near the center of the coverage area may not be as susceptible to interference since it is further away from the eNBs serving the neighboring cells.

Once the eNB identifies the UE, the eNB may inform an assisting eNB, i.e., the eNB whose transmissions may be causing interference to the UE, about the UE (blocks 710). As an example, the eNB may inform the assisting eNB with information about the UE. Furthermore, the information may allow the assisting eNB to gather information about the UE, such as its direction, spatial covariance matrix, and the like. The eNB may inform the assisting eNB by sending a message to the assisting eNB (block 715), requesting that the assisting eNB make measurements of uplink transmissions made by the UE, for example. The eNB may also delay for a predetermined amount of time to allow the assisting eNB time to make the measurements of the uplink transmissions (block 720). It is noted that informing the assisting eNB (blocks 710) may be an optional operation.

The eNB may schedule a transmission for the UE (block 725). The eNB may schedule the transmission to the UE by assigning a network resource(s) to the UE and informing the UE about the network resource(s) so that the UE may be able to detect the transmission. In addition to scheduling the transmission for the UE and informing the UE regarding the transmission, the eNB may send a message, such as a coordination request message, to the assisting eNB. The message, such as the coordination request message, may ask the assisting eNB to help reduce interference to the UE.

As an example, the message may include information that identifies the UE that may be impacted by transmissions from the assisting eNB. The message may also include information about the transmission scheduled for the UE, such as information about the network resource(s), modulation and coding scheme, and the like, which may be used by the assisting eNB to help reduce interference to the UE. The assisting eNB may make measurements of uplink transmissions of the UE to determine the direction of the UE, its spatial covariance matrix, and the like, which may be used to help reduce interference to the UE. The eNB may also delay for a predetermined amount of time to allow the assisting eNB time to make the measurements of the uplink transmissions (block 730). The eNB may transmit to the UE in the network resource(s) (block 735).

Figure 8:
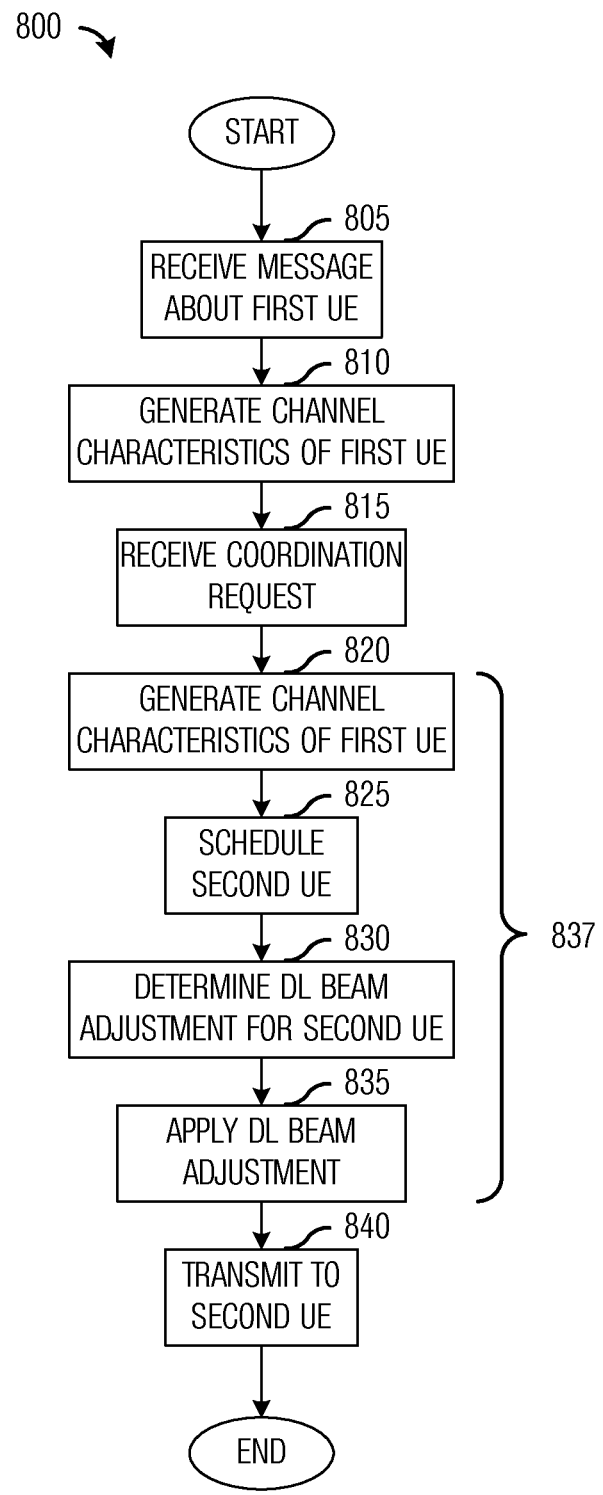
FIG. 8 is a flow diagram of operations occurring in an eNB as the eNB transmits to a UE that may cause interference with another UE operating in a neighboring cell, where the eNB performs additional operations to reduce interference to the another UE.

FIG. 8 illustrates a flow diagram of operations 800 occurring in an eNB as the eNB transmits to a UE that may cause interference with another UE operating in a neighboring cell, where the eNB performs additional operations to reduce interference to the other UE. Operations 800 may be indicative of operations occurring in an eNB, such as eNB 210 of FIG. 2*a*, as the eNB transmits to a UE, such as UE2 220, with additional operations taken to reduce interference to the other UE, where the other UE is served by another eNB that uses co-polarized antennas (i.e., has correlated channels) or uses cross-polarized antennas.

Operations 800 may begin with the eNB receiving a message including information about a first UE (block 805). As an example, the message may be from the other eNB and the message may inform the eNB about the first UE, which may be interfered with by transmissions from the eNB. The eNB may make measurements of uplink transmissions made by the first UE to generate channel characteristics of the first UE (block 810). The eNB may make use of the channel characteristics of the first UE to estimate a direction for the first UE, a spatial covariance matrix for the first UE, and the like. It is noted that since the first UE may make a relatively small number of uplink transmissions, blocks 805 and 810 may allow the eNB additional opportunities to make the measurements, which may result in better interference reducing performance. It is noted that blocks 805 and 810 may be optional.

The eNB may receive a message, such as a coordination request message, for the first UE, wherein the message, such as the coordination request message, may request that the eNB reduce interference to the first UE, by aiming a transmission to one of its own UEs away from the first UE to help reduce interference to the first UE, for example (block 815). The coordination request message may be transmitted by the other eNB serving the first UE. The coordination request message may ask the eNB to help reduce interference to the first UE. The coordination request message may include information that identifies the first UE. The coordination request message may also include information about a transmission scheduled for the first UE, such as information about network resource(s) allocated for the transmission, modulation and coding scheme, and the like, which may be used by the eNB to help reduce interference to the first UE.

In order to reduce interference to the first UE, by aim its transmissions away from the first UE, for example, the eNB may need to obtain information regarding a direction of the first UE. The eNB may make measurements of uplink transmissions of the first UE to generate the channel characteristics of the first UE, which may be used to determine information regarding the direction of the first UE, as well as its spatial covariance matrix, and the like, which may be used to help reduce interference to the first UE (block 820). If the eNB also made prior measurements of uplink transmissions of the first UE and generate prior channel characteristics of the first UE in block 810, then the measurements of the uplink transmissions of the first UE in block 820 may be used to augment information about the first UE (e.g., the direction, the spatial covariance matrix, and the like), thereby potentially producing better interference reducing performance.

From the measurements of the uplink transmissions of the first UE and the resulting channel characteristics of the uplink of the first UE, the eNB may estimate the direction of the first UE. The eNB may schedule a second UE according to the direction of the first UE (block 825). The direction of the first UE may be used as a consideration in the scheduling of UEs in order to reduce interference to the first UE. In addition to considering the direction of the first UE, the eNB may also consider the direction of its own UEs. The eNB may estimate the direction of its own UEs through channel characteristics of its own UEs generated from uplink measurements similar to the uplink measurements made for the first UE. Alternatively, the eNB may obtain the direction of its own UEs from another entity in the communications system.

As an example, if the eNB is to chose between scheduling one of two UEs and a first of the two UEs is orthogonal to the first UE while a second of the two UEs is not orthogonal, then the eNB may chose to schedule the first of the two UEs to reduce interference to the first UE. Similarly, if the first of the two UEs is more orthogonal to the first UE than the second of the two UEs, then the eNB may chose to schedule the first of the two UEs.

However, other scheduling criteria may also need to be met, such as fairness criteria, UE scheduling history, availability of messages to transmit to UEs, message priority, UE priority, communications system condition, and the like. As an example, if the eNB has a UE that is orthogonal to the first UE but there are no messages to transmit to the UE, then the eNB may not schedule the UE. Similarly, if the only UEs with messages to transmit to are UEs that are not orthogonal to the first UE, the eNB may have no choice but to schedule those UEs.

The eNB may determine a beam adjustment, e.g., rotation matrix $\Phi_2$, a scaled rotation matrix, a rotation matrix multiplied by a factor, a masked rotation matrix, a rotation matrix masked by an antenna selection mask, an approximation of a rotation matrix, and the like, for its transmission to the second UE (block 830). In other words, the eNB may adjust its aim of the transmission to the second UE in an attempt to reduce interference to the first UE. In general, the beam adjustment may be determined by the direction of the first UE and the direction of the second UE (which may also be measured by the eNB or obtained by the eNB). The beam adjustment may be towards an angle that is orthogonal to the direction of the first UE. In other words, the beam adjustment may aim the transmission to the second UE so that an angle between the direction of the first UE and the transmission to the second UE is orthogonal or as close to orthogonal as permitted while meeting a maximum performance degradation threshold. As an example, the maximum performance degradation threshold may place a restriction on a reduction in received signal strength permissible at the second UE. Examples of the maximum performance degradation threshold may range from 0.5 dB to 1 dB. Therefore, a magnitude of the beam adjustment may be dependent on the orthogonality of the first UE and the second UE.

As discussed above, the beam adjustment may be implemented as a rotation matrix, a rotation matrix that has been multiplied by a factor (such as a scalar value or a vector value), a scaled rotation matrix, a masked rotation matrix, a rotation matrix masked by an antenna selection mask, an approximation of a rotation matrix, and the like. In general, the beam adjustment may be expressed as FE, where F is a unitary matrix (e.g., a rotation matrix) and E is a power scaling diagonal matrix. Matrix E may also be used to implement a mask, such as an antenna selection mask. The masking of matrix F by matrix E may be used, for example, in a communications system configuration with a distributed antenna array system or a remote radio head (RRH) based system with centralized capability, wherein uplink measurements may be used to determine which transmission points participate in serving a UE. While in a more general masked rotation matrix application, which may imply a zeroing (e.g., a turning off) of some elements of the rotation matrix may be implemented as an element wise multiplication between matrix F and matrix E. These beam adjustments and other mathematical variations thereof may be used to aim the transmission to the second UE towards an angle orthogonal to the first UE to reduce interference to the first UE.

As an example, if a first direction of the first UE relative to the eNB and a second direction of the second UE relative to the eNB are orthogonal, then there may not be a need for the beam adjustment. As another example, if the first direction of the first UE and the second direction of the second UE (both relative to the eNB) are almost orthogonal, then the beam adjustment may be relatively small, just enough to make the first direction of the first UE and a direction of the transmission to the second UE (both relative to the eNB) orthogonal. As yet another example, if the first direction of first UE and the second direction of the second UE (both relative to the eNB) are not orthogonal, then the beam adjustment may be relatively large, enough to make the first direction of first UE and the direction of the transmission to the second UE (both relative to the eNB) orthogonal.

It is noted that if the first direction of the first UE and the second direction of the second UE are not orthogonal, it may not be possible in some cases to provide enough beam adjustment to make the first direction of the first UE and the direction of the transmission to the second UE (both relative to the eNB) orthogonal without significantly impacting the signal strength of the transmission as received at the second UE, i.e., causing the received signal strength to fail to meet the maximum performance degradation threshold. As an example, referring to FIG. 4, if the beam adjustment is greater than 20 degrees, then the energy loss due to the beam adjustment may be greater than 0.5 dB. In such a situation, the amount of the beam adjustment may be limited to a maximum beam adjustment, such as 20 degrees. A detailed discussion of the use of uplink channel measurements to determine a beam adjustment and an application thereof to aim a transmission to the second UE towards an angle orthogonal to the direction of the first UE is provided below.

As discussed above, if the other eNB uses co-polarized antennas, the eNB may be able to approximate the beam adjustment as a diagonal close to constant modulus matrix rather than having to determine the beam rotation matrix $\Phi_2$. As an example, the beam adjustment may be expressed as $\phi_{2,ii} = u_{2,i,adj}^{UL}/u_{2,i}^{UL}$, where $\phi_{2,ii}$, $u_{2,i}^{UL}$ and are the i-th diagonal element of $\Phi_2$, $\vec{f}_{2,adj}^{DL}$, and $\vec{f}_2^{DL}$, respectively. While if the other eNB uses cross-polarized antennas, it is noted that nearly identical operations may be used to approximate the beam adjustment, but based on a composite direction expressible as $$V_{comp} = \begin{bmatrix} u_{1,hh} \\ u_{1,vv} \end{bmatrix}.$$

Hence, it may be possible to approximate the beam adjustment with a diagonal matrix with constant modulus diagonal entries in the case where $\vec{f}_2^{UL}$ and $\vec{f}_{2,adj}^{DL}$ are both constant modulus. Furthermore, in the case of small beam adjustments, it may be reasonable to choose to approximate $\Phi_2$ as a diagonal matrix though not one with strictly constant modulus non-zero elements, given by: $\phi_{2,ii} = u_{2,i,adj}^{UL}/u_{2,i}^{UL}$.

It is noted that the precoder for the transmission to the second UE (e.g., $\vec{f}_2^{DL}$) and the adjusted vector for precoding the transmission to the second UE (e.g., $\vec{f}_{2,adj}^{DL}$) may be selected from a set of quantized vectors. In such a situation, the beam adjustment may be selected as described above, applied to the precoder for the transmission to the second UE (e.g., $\vec{f}_2^{DL}$) and then the adjusted precoder (e.g., $\vec{f}_{2,adj}^{DL}$) may be quantized.

In addition to (or in place of) adjusting the direction of the transmission to the second UE through the use of the beam adjustment, the eNB may optionally adjust the transmit power level of the transmission to the second UE (also block 830). Generally, reducing the transmit power level of a transmission results in a reduction in the interference caused by the transmission. However, reducing the transmit power level of the transmission may also negatively impact the signal quality of the transmission at the second UE. Therefore, the reduction in the transmit power level may occur only if there is sufficient signal quality and/or if the second UE can tolerate the reduction in signal quality.

The eNB may apply the beam adjustment to the precoder used to transmit to the second UE, as well as an optional reduction in transmit power level (block 835). Collectively, blocks 820, 825, 830, and 835 may be referred to as aiming the transmission (blocks 837). The eNB may transmit to the second UE using the adjusted precoder and the optional reduction in transmit power level (block 840).

As a discussion of an illustrative example of operations occurring in the eNB as the eNB attempts to reduce interference caused to a first UE served by another eNB, consider a communications system configured as shown in FIG. 2a. Let eNB 210 receive a request from eNB 205 to assist UE 215 by reducing downlink interference to UE 215. The request may specify a specific downlink network resource where eNB 205 is requesting assistance from eNB 210. eNB 210 considers a scheduling of UE 220 in the specified network resource and may attempt to accomplish the desired interference reduction at UE 215. In order to attempt to provide the desired interference reduction, eNB 210 may make a few assumptions related to an imperfect reciprocity between downlink channels and uplink channels. The assumptions may include: 1) relationships between channel directions in the uplink and in the downlink are similar; and 2) it may generally not be possible to convert uplink channel information directly into downlink channel information, and vice versa.

eNB 210 may select UE 220 from the UEs that it is serving. As an example, if proportional fairness scheduling is used, eNB 210 may consider a number of hypotheses for potential UEs before selecting UE 220. As an example, eNB 210 may consider signal to noise plus interference ratio (SINR) measurement, signal to noise ratio (SNR) measurements, channel quality indicators (CQI), and the like, of its UEs.

eNB 210 may measure uplink transmissions of UE 215 to estimate a direction of UE 215 relative to eNB 210. eNB 210 may also measure transmissions of UE 220 to estimate a direction of UE 220 relative to eNB 210. As an example, eNB 210 may measure uplink transmissions of UE 215 and of UE 220 to derive a channel spatial covariance matrix for each UE. In order to help reduce the impact of noise, the measurements made by UE 210 may be averaged in time and/or frequency.

eNB 210 may then estimate the direction of UE 215 and of UE 220 (both relative to eNB 210) by applying singular value decomposition (SVD) or similar Eigen-decomposition techniques to the channel spatial covariance matrices of UE 215 and of UE 220, respectively.

eNB 210 may determine a linear transformation "L", e.g., a beam adjustment, of the direction of UE 220 that produces in a hypothetical modified uplink channel direction of UE 220. The linear transformation L may be chosen so that the hypothetical modified uplink channel direction of UE 220 is pointed away from the measured uplink channel direction of UE 215 and towards an angle orthogonal to the direction of UE 215. As an example, the linear transformation L may be expressed as a rotation matrix, a mathematical variation thereof, an approximation thereof, and the like. It may be possible to simplify the linear transformation L by choosing a diagonal form of the rotation matrix.

Referring back to the situation where proportional fairness is used, eNB 210 may determine an adjustment (e.g., an adjustment for SINR, SNR, CQI, and the like) according to the beam adjustment, which may then be used to select a UE, e.g., UE 220. As an example, the adjustment SINR, SNR, CQI, and the like may be used to determine a prediction on an impact of the rate adjustment on the UEs and the UEs having the best proportional fairness metric, may be selected. If multiple UEs have the same proportional fairness metric, then additional criteria may be used, such as service history, priority, amount of data to transmit, and the like.

eNB 210 may have also determined (as is the case in a time division duplex communications system) or has been provided (as is the case in a frequency division duplex communications system) a desired direction for a downlink transmission to UE 220, where the desired direction may be expressed as a precoding vector for use in the downlink transmission. Therefore, to reduce the interference to UE 215, eNB 210 may apply the linear transformation L to the desired direction for the downlink transmission to UE 220. As an example, considering a situation where the desired direction for the downlink transmission to UE 220 is expressed as a precoding vector and the linear transformation L is expressed as a rotation matrix, a modified precoding vector for the downlink transmission by eNB 210 to UE 220 may be obtained by pre-multiplying the desired precoding vector by the rotation matrix. As discussed previously, for certain configurations, such as eNB 210 using co-polarized or cross polarized antennas, a simplification wherein a diagonal close to constant modulus matrix may be used in place of the rotation matrix.

Figure 9:
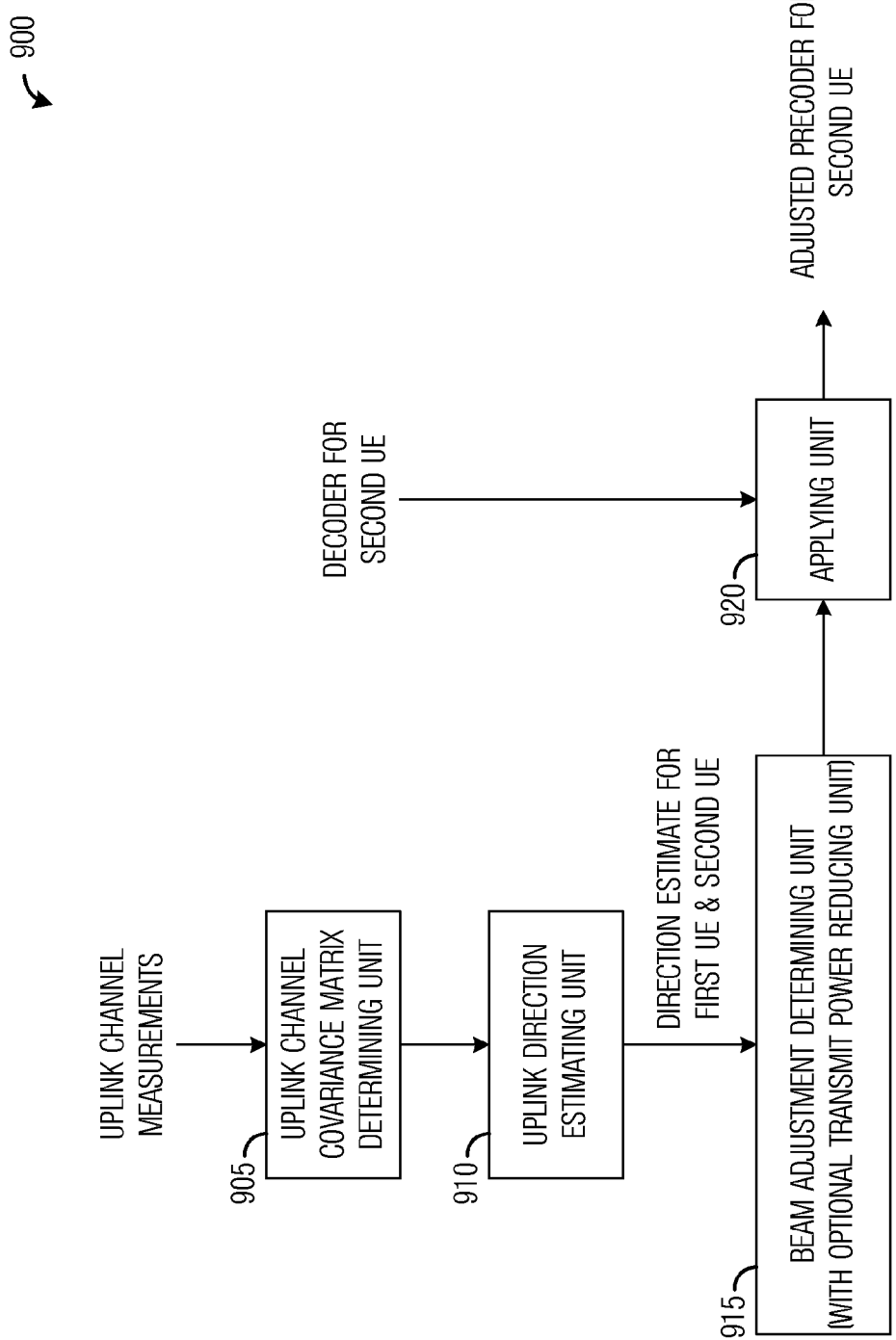
FIG. 9 is a diagram of a precoder adjusting unit.

FIG. 9 illustrates a diagram of a precoder adjusting unit 900. Precoder adjustment unit 900 may be implemented as software modules executing in a processor, custom designed integrated circuits providing computational support for a processor, a compiled logic array providing computational support for a processor, and the like. As discussed previously, precoder adjusting unit 900 may be used to determine a beam adjustment as well as an optional transmit power level adjustment and apply the adjustment(s) to the precoder of the second UE, i.e., the UE served by an eNB that is cooperating to reduce interference. Precoder adjusting unit 900 includes an uplink channel covariance matrix determining unit 905 that may be used to generate a channel covariance matrix for a communications channel according to channel measurements, such as uplink channel measurements. As an example, uplink channel covariance matrix determining unit 905 may generate a channel covariance matrix for a communications channel between eNB 205 and UE1 215 based on measurements of uplink transmissions made by UE1 215. Similarly, uplink channel covariance matrix determining unit 905 may generate a channel covariance matrix for a communications channel between eNB 210 and UE2 220 according to measurements of uplink transmissions made by UE2 220.

Precoder adjusting unit 900 also includes an uplink direction estimating unit 910 that may be used to estimate a direction of a UE. As an example, uplink direction estimating unit 910 may make use of a channel covariance matrix of a channel of a UE to estimate the direction of the UE. As another example, uplink direction estimating unit 910 may estimate the direction of UE1 215 from a channel covariance matrix for UE1 215 and the direction of UE2 220 from a channel covariance matrix for UE2 220.

Precoder adjusting unit 900 also includes a beam adjustment determining unit 915 that may be used to determine a beam adjustment (such as a rotation matrix, a rotation matrix that has been multiplied by a factor (such as a scalar value or a vector value), a scaled rotation matrix, a masked rotation matrix, a rotation matrix masked by an antenna selection mask, an approximation of a rotation matrix, and the like) to be used to aim the beam of a precoder used to transmit to the second UE to reduce interference. In general, beam adjustment determining unit 915 determines the beam adjustment that aims a precoder used to transmit to the second UE to make the transmission orthogonal (or more orthogonal) to the direction of the first UE, i.e., the UE that is potentially being interfered with by the transmission to the second UE.

Beam adjustment determining unit 915 may determine the beam adjustment to be used in aiming the precoder according to the channel covariance matrices of the user equipments involved in interference reduction. As discussed previously, in situations where co-polarized antennas and/or cross-polarized antennas are used, it may be possible to approximate the beam adjustment with the diagonal rotation matrix. Beam adjustment determining unit 915 exploits known characteristics of co-polarized antennas and/or cross-polarized antennas to generate the diagonal rotation matrix (e.g., an approximation to the beam adjustment), while reduces computational complexity involved in the beam adjustment. As an example, beam adjustment determining unit 915 may determine the beam adjustment for UE2 220 according to the channel covariance matrices of UE1 215 and UE2 220. Beam adjustment determining unit 915 may also help to reduce interference by adjusting the transmit power level of a transmission to the second UE. It is noted that beam adjustment determining unit 915 may determine the beam adjustment while being bound by a maximum performance degradation threshold, which may place a limit on the performance decrease realized at the second UE while reducing interference at the first UE.

An applying unit 920 may apply the beam adjustment (as well as possibly the transmit power level adjustment) to a precoder that is used to transmit the transmission to the second UE, producing an adjusted precoder that may be used to precode the transmission to the second UE. If quantization is used, the adjusted precoder may be quantized prior to being used to precode the transmission to the second UE.

Figure 10:
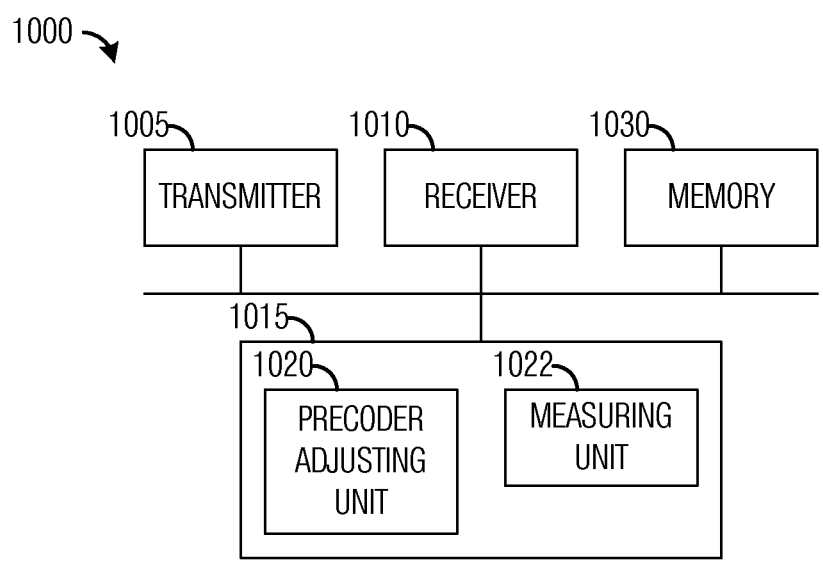
FIG. 10 is a diagram of a communications device.

FIG. 10 illustrates a diagram of a communications device 1000. Communications device 1000 may be an implementation of communications controller, such as an eNB, a base station, and the like, of a communications system. Communications device 1000 may be used to implement various ones of the embodiments discussed herein. As shown in FIG. 10, a transmitter 1005 is configured to send messages, signals, and the like, and a receiver 1010 is configured to receive messages, signals, and the like. Transmitter 1005 and receiver 1010 may have a wireless interface, a wireline interface, or a combination thereof.

A precoder adjusting unit 1020 is configured to adjust a direction of a precoder used to precode a transmission to help reduce interference arising from the transmission at a communications device. Precoder adjusting unit 1020 may make use of channel characteristics of the communications device to determine a direction of the communications device, which may be used to determine a beam adjustment for the precoder to aim the direction of the precoder towards an angle that is orthogonal to the direction of the communications device. Precoder adjusting unit 1020 may also adjust a transmit power level of the precoder to help further reduce interference. An example detailed description of precoder adjusting unit 1020 was provided previously. A measuring unit 1022 is configured to measure transmissions, such as uplink transmissions, by the communications device to determine the channel characteristics of the communications device. A memory 1030 is configured to store channel measurements, channel characteristics, directions, angle adjustments, and the like.

The elements of communications device 1000 may be implemented as specific hardware logic blocks. In an alternative, the elements of communications device 1000 may be implemented as software executing in a processor, controller, application specific integrated circuit, or so on. In yet another alternative, the elements of communications device 1000 may be implemented as a combination of software and/or hardware.

As an example, transmitter 1005 and receiver 1010 may be implemented as a specific hardware block, while precoder adjusting unit 1020, and measuring unit 1022 may be software modules executing in a processor 1015, such as a microprocessor, a digital signal processor, a custom circuit, or a custom compiled logic array of a field programmable logic array.

Although the present disclosure and its advantages have been described in detail, it should be understood that various changes, substitutions and alterations can be made herein without departing from the spirit and scope of the disclosure as defined by the appended claims.

What is claimed is:

1. A method for reducing interference at a first user equipment (UE), the method comprising:
receiving, by a second communications controller, a request to reduce interference at the first UE, the first UE being served by a first communications controller;
determining, by the second communications controller, a beam adjustment in accordance with uplink transmission measurements of the first UE and a second UE, the beam adjustment to aim a transmission to the second UE away from the second UE and towards an angle orthogonal to a first direction of the first UE relative to the second communications controller, the second UE being served by the second communications controller, wherein determining the beam adjustment comprises:
generating a first uplink channel characteristic of the first UE from the uplink transmission measurements of the first UE;
generating a second uplink channel characteristic of the second UE from the uplink transmission measurements of the second UE;
estimating the first direction of the first UE relative to the second communications controller according to the first uplink channel characteristic of the first UE;
estimating a second direction of the second UE relative to the second communications controller according to the second uplink channel characteristic of the second UE; and
determining the beam adjustment in accordance with the first direction of the first UE and the second direction of the second UE;
pre-adjusting, by the second communications controller, the transmission with the beam adjustment; and
transmitting, by the second communications controller, the pre-adjusted transmission to the second UE.

2. The method of claim 1, wherein pre-adjusting the transmission comprises adjusting a precoder of the transmission according to the beam adjustment.

3. The method of claim 1, wherein the beam adjustment comprises at least one of a rotation matrix, a scaled rotation matrix, a rotation matrix multiplied by a factor, a masked rotation matrix, a rotation matrix masked by an antenna selection mask, an approximation of a rotation matrix, and a combination thereof.

4. The method of claim 1, wherein the beam adjustment comprises a diagonal matrix.

5. The method of claim 4, wherein the first communications controller includes co-polarized antennas, and wherein determining the beam adjustment comprises: evaluating $\phi_{2,ii} = u_{2,i,adj}^{UL}/u_{2,i}^{UL}$, with $\phi_{2,ii}$, $u_{2,i,adj}^{UL}$, and $u_{2,i}^{UL}$ being i-th diagonal elements of $\Phi_2$, and $\vec{f}_{2,adj}^{DL}$, and $\vec{f}_2^{DL}$, respectively, and $\Phi_2$ being the beam adjustment applied to a precoder of the transmission, $\vec{f}_{2,adj}^{DL}$ being a vector representing a beam adjusted direction of the transmission to the second UE, and $\vec{f}_2^{DL}$ being a vector representing a direction of the transmission to the second UE prior to the beam adjustment.

6. The method of claim 5, further comprising approximating the beam adjustment with $\phi_{ii} = u_{i,adj}/u_i$, with $\{u_i\}$ being elements of a dominant Eigen-vector, and $\{u_{i,adj}\}$ being elements of an angle of the precoder after adjustment.

7. The method of claim 4, wherein the first communications controller includes cross-polarized antennas, and wherein determining the beam adjustment comprises: evaluating $\phi_{2,ii} = u_{2,i,adj}^{UL}/u_{2,i}^{UL}$, with $\phi_{2,ii}$, $u_{2,i,adj}^{UL}$, and $u_{2,i}^{UL}$ being i-th diagonal elements of $\Phi_2$, and $\vec{f}_{2,adj}^{DL}$, and $\vec{f}_2^{DL}$, respectively, and $\Phi_2$ being the beam adjustment applied to a precoder of the transmission, $\vec{f}_{2,adj}^{DL}$ being a vector representing a beam adjusted direction of the transmission to the second UE, and $\vec{f}_2^{DL}$ being a vector representing a direction of transmission to the second UE prior to the beam adjustment.

8. The method of claim 1, wherein pre-adjusting the transmission further comprises adjusting a transmit power level of the transmission.

9. The method of claim 8, wherein adjusting the transmit power level comprises reducing the transmit power level.

10. The method of claim 1, wherein pre-adjusting the transmission changes a direction of the transmission to the second UE so that the changed direction of the transmission is orthogonal to the first direction of the first UE.

11. The method of claim 1, wherein pre-adjusting the transmission changes a direction of the transmission to the second UE so that the changed direction of the transmission is orthogonal to the first direction of the first UE and is bounded by a maximum performance degradation threshold.

12. The method of claim 11, wherein the changed direction of the transmission for the second UE is not orthogonal to the first UE.

13. The method of claim 1, further comprising prior to receiving the request to reduce the interference at the first UE:
  receiving a prior request to assist the first UE;
  generating a prior uplink channel characteristic of the first UE from prior uplink transmission measurements of the first UE; and
  estimating a prior direction of the first UE relative to the second communications controller according to the prior uplink channel characteristic of the first UE.

14. An assisting communications controller comprising:
  a receiver configured to receive a request to reduce interference at a first UE, the first UE being served by a first communications controller;
  a processor operatively coupled to the receiver, the processor configured to:
    determine a beam adjustment in accordance with uplink transmission measurements of the first UE and a second UE, the beam adjustment to aim a transmission to the second UE away from the second UE and towards an angle orthogonal to a first direction of the first UE relative to the assisting communications controller, the second UE being served by the assisting communications controller, wherein the processor configured to determine the beam adjustment comprises the processor configured to:
      generate a first uplink channel characteristic of the first UE from the uplink transmission measurements of the first UE,
      generate a second uplink channel characteristic of the second UE from the uplink transmission measurements of the second UE,
      estimate the first direction of the first UE relative to the assisting communications controller according to the first uplink channel characteristic of the first UE,
      estimate a second direction of the second UE relative to the assisting communications controller according to the second uplink channel characteristic of the second UE, and
      determine the beam adjustment in accordance with the first direction of the first UE and the second direction of the second UE, and
    pre-adjust the transmission with the beam adjustment; and
  a transmitter operatively coupled to the processor, the transmitter configured to transmit the pre-adjusted transmission to the second UE.

15. The assisting communications controller of claim 14, wherein the processor is configured to adjust a transmit power level of the transmission.

16. The assisting communications controller of claim 15, wherein the processor is configured to reduce the transmit power level of the transmission.

17. The assisting communications controller of claim 14, wherein the receiver is configured to receive a prior request to assist the first UE, and wherein the processor is configured to generate a prior uplink channel characteristic of the first UE from prior uplink transmission measurements of the first UE, and to estimate a prior direction of the first UE relative to the assisting communications controller according to the prior uplink channel characteristic of the first UE.

18. The assisting communications controller of claim 14, wherein the processor configured to pre-adjust the transmission comprises the processor configured to adjust a precoder of the transmission according to the beam adjustment.

19. The assisting communications controller of claim 14, wherein the beam adjustment comprises at least one of a rotation matrix, a scaled rotation matrix, a rotation matrix multiplied by a factor, a masked rotation matrix, a rotation matrix masked by an antenna selection mask, an approximation of a rotation matrix, and a combination thereof.

20. The assisting communications controller of claim 14, wherein the beam adjustment comprises a diagonal matrix.

21. The assisting communications controller of claim 20, wherein the first communications controller includes co-polarized antennas, and wherein the processor configured to determine the beam adjustment comprises: the processor configured to evaluate $\phi_{2,ii} = u_{2,i,adj}^{UL}/u_{2,i}^{UL}$, with $\phi_{2,ii}$, $u_{2,i,adj}^{UL}$, and $u_{2,i}^{UL}$ being i-th diagonal elements of $\Phi_2$, and $\vec{f}_{2,adj}^{DL}$, and $\vec{f}_2^{DL}$, respectively, and $\Phi_2$ being the beam adjustment applied to a precoder of the transmission, $\vec{f}_{2,adj}^{DL}$ being a vector representing a beam adjusted direction of the transmission to the second UE, and $\vec{f}_2^{DL}$ being a vector representing a direction of the transmission to the second UE prior to the beam adjustment.

22. The assisting communications controller of claim 21, further comprising the processor configured to approximate the beam adjustment with $\phi_{ii} = u_{i,adj}/u_i$, with $\{u_i\}$ being elements of a dominant Eigen-vector, and $\{u_{i,adj}\}$ being elements of an angle of the precoder after adjustment.

23. The assisting communications controller of claim 20, wherein the first communications controller includes cross-polarized antennas, and wherein the processor configured to determine the beam adjustment comprises: the processor configured to evaluate $\phi_{2,ii} = u_{2,i,adj}^{UL}/u_{2,i}^{UL}$, with $\phi_{2,ii}$, $u_{2,i,adj}^{UL}$, and $u_{2,i}^{UL}$ being i-th diagonal elements of $\Phi_2$, and $\vec{f}_{2,adj}^{DL}$, and $\vec{f}_2^{DL}$, respectively, and $\Phi_2$ being the beam adjustment applied to a precoder of the transmission, $\vec{f}_{2,adj}^{DL}$ being a vector representing a beam adjusted direction of the transmission to the second UE, and $\vec{f}_2^{DL}$ being a vector representing a direction of transmission to the second UE prior to the beam adjustment.

24. The assisting communications controller of claim 14, wherein the processor configured to pre-adjust the transmission comprises the processor configured to change a direction of the transmission to the second UE so that the changed direction of the transmission is orthogonal to the first direction of the first UE.

25. The assisting communications controller of claim 14, wherein the processor configured to pre-adjust the transmission comprises the processor configured to change a direction of the transmission to the second UE so that the changed direction of the transmission is orthogonal to the first direction of the first UE and is bounded by a maximum performance degradation threshold.

26. The assisting communications controller of claim 25, wherein the changed direction of the transmission for the second UE is not orthogonal to the first UE.

* * * * *